US011594211B2

(12) United States Patent
Hager

(10) Patent No.: US 11,594,211 B2
(45) Date of Patent: *Feb. 28, 2023

(54) METHODS AND SYSTEMS FOR CORRECTING TRANSCRIBED AUDIO FILES

(71) Applicant: III Holdings 1, LLC, Wilmington, DE (US)

(72) Inventor: Paul M. Hager, Stoughton, WI (US)

(73) Assignee: III Holdings 1, LLC, Wilmington, DE (US)

( * ) Notice: Subject to any disclaimer, the term of this patent is extended or adjusted under 35 U.S.C. 154(b) by 234 days.

This patent is subject to a terminal disclaimer.

(21) Appl. No.: 17/089,179

(22) Filed: Nov. 4, 2020

(65) Prior Publication Data

US 2021/0118428 A1 Apr. 22, 2021

Related U.S. Application Data

(60) Continuation of application No. 15/826,110, filed on Nov. 29, 2017, now Pat. No. 10,861,438, which is a (Continued)

(51) Int. Cl.
*G10L 15/06* (2013.01)
*G10L 15/18* (2013.01)

(Continued)

(52) U.S. Cl.
CPC ............ *G10L 15/063* (2013.01); *G06F 16/31* (2019.01); *G06F 40/232* (2020.01); *G10L 15/01* (2013.01);

(Continued)

(58) Field of Classification Search
USPC ........................................................ 704/244
See application file for complete search history.

(56) References Cited

U.S. PATENT DOCUMENTS 4,850,891 A 7/1989 Walkup et al.
5,495,533 A 2/1996 Linehan et al.

(Continued)

FOREIGN PATENT DOCUMENTS

EP 0 859 314 A2 8/1998
GB 2427500 12/2006

(Continued)

OTHER PUBLICATIONS

International Search Report for PCT/US2007/066791 dated May 2, 2008.

(Continued)

*Primary Examiner* — Douglas Godbold
(74) *Attorney, Agent, or Firm* — Crowell & Moring LLP

(57) ABSTRACT

Methods and systems for correcting transcribed text. One method includes receiving audio data from one or more audio data sources and transcribing the audio data based on a voice model to generate text data. The method also includes making the text data available to a plurality of users over at least one computer network and receiving corrected text data over the at least one computer network from the plurality of users. In addition, the method can include modifying the voice model based on the corrected text data.

20 Claims, 13 Drawing Sheets

Related U.S. Application Data division of application No. 14/981,243, filed on Dec. 28, 2015, now Pat. No. 9,858,256, which is a continuation of application No. 14/138,609, filed on Dec. 23, 2013, now Pat. No. 9,245,522, which is a continuation of application No. 13/803,733, filed on Mar. 14, 2013, now abandoned, which is a continuation of application No. 12/278,332, filed as application No. PCT/US2007/066791 on Apr. 17, 2007, now Pat. No. 8,407,052.

(60) Provisional application No. 60/792,640, filed on Apr. 17, 2006.

(51) Int. Cl.

| | |
|---|---|
| ***G06F 40/232*** | (2020.01) |
| ***G10L 15/065*** | (2013.01) |
| ***G06F 16/31*** | (2019.01) |
| ***G10L 15/26*** | (2006.01) |
| ***G10L 15/01*** | (2013.01) |
| ***G10L 15/183*** | (2013.01) |

(52) U.S. Cl.

CPC ............ *G10L 15/065* (2013.01); *G10L 15/18* (2013.01); *G10L 15/183* (2013.01); *G10L 15/26* (2013.01); *G10L 2015/0635* (2013.01)

(56) References Cited

U.S. PATENT DOCUMENTS 5,732,077 A 3/1998 Whitehead
5,801,985 A 9/1998 Roohparvar et al.
5,864,805 A * 1/1999 Chen ....................... G10L 15/22 704/E15.04
5,875,436 A 2/1999 Kikinis
5,930,167 A 7/1999 Lee et al.
5,956,681 A 9/1999 Yamakita
6,173,259 B1 * 1/2001 Bijl ..................... H04M 3/5307 704/235
6,222,909 B1 4/2001 Qua
6,243,677 B1 6/2001 Arslan
6,275,849 B1 8/2001 Ludwig
6,308,151 B1 10/2001 Smith
6,366,882 B1 4/2002 Bijl
6,404,762 B1 6/2002 Luzeski
6,411,685 B1 6/2002 O'Neal
6,418,410 B1 * 7/2002 Nassiff .................. G10L 15/183 704/235
6,483,899 B2 11/2002 Agraharam
6,507,643 B1 1/2003 Groner
6,535,586 B1 3/2003 Cloutier
6,643,291 B1 11/2003 Yoshihara
6,697,458 B1 2/2004 Kunjibettu
6,697,841 B1 2/2004 Sheffield
6,704,394 B1 3/2004 Touma
6,738,800 B1 5/2004 Aquilon
6,754,631 B1 * 6/2004 Din ......................... G10L 15/26 704/E15.045
6,775,359 B1 8/2004 Ron
6,775,651 B1 8/2004 Lewis
6,823,306 B2 * 11/2004 Reding ................... G10L 15/00 704/E15.047
6,857,008 B1 2/2005 Shenefiel
6,865,258 B1 3/2005 Polcyn
6,868,143 B1 3/2005 Menon
6,901,364 B2 * 5/2005 Nguyen .............. G10L 15/1815 704/E15.047
6,937,986 B2 8/2005 Denenberg
6,963,633 B1 * 11/2005 Diede ..................... G10L 15/26 704/E15.045
6,965,666 B1 11/2005 Zhang
6,980,953 B1 * 12/2005 Kanevsky ............... G06F 40/58 704/277
7,016,844 B2 3/2006 Othmer
7,023,968 B1 4/2006 Silvester
7,035,804 B2 4/2006 Saindon
7,035,854 B2 4/2006 Hsaio et al.
7,103,154 B1 9/2006 Cannon
7,127,633 B1 10/2006 Olson et al.
7,130,401 B2 10/2006 Rampey
7,130,918 B2 10/2006 Ouzounidis
7,146,320 B2 12/2006 Ju
7,243,351 B2 7/2007 Kundu
7,317,788 B2 * 1/2008 Caspi ...................... H04L 51/00 704/235
7,346,505 B1 3/2008 Sherwood
7,539,086 B2 5/2009 Jaroker
7,568,199 B2 7/2009 Bozak et al.
7,590,536 B2 * 9/2009 Bates .................... G10L 15/197 704/231
7,660,715 B1 2/2010 Thambiratnam
7,685,602 B1 3/2010 Tran et al.
7,706,520 B1 * 4/2010 Waterson .......... H04M 3/42221 379/265.06
8,196,133 B2 6/2012 Kakumani et al.
8,407,052 B2 * 3/2013 Hager ................... G10L 15/183 704/235
8,726,278 B1 5/2014 Shawver et al.
9,245,522 B2 * 1/2016 Hager ................... G10L 15/065
9,858,256 B2 * 1/2018 Hager ..................... G06F 16/31
10,861,438 B2 * 12/2020 Hager ................... G10L 15/065
2002/0032716 A1 3/2002 Nagato
2002/0059094 A1 5/2002 Hosea et al.
2002/0085690 A1 7/2002 Davidson
2002/0159573 A1 10/2002 Hitzeman
2002/0178002 A1 * 11/2002 Boguraev ............... G10L 15/26 704/235
2003/0002643 A1 1/2003 Seibel
2003/0009528 A1 1/2003 Sharif
2003/0036903 A1 * 2/2003 Konopka .............. G10L 15/065 704/E15.009
2003/0046350 A1 * 3/2003 Chintalapati ........... H04L 67/06 704/E15.045
2003/0050777 A1 * 3/2003 Walker, Jr. .............. G10L 15/32 704/E15.047
2003/0068023 A1 4/2003 Singh
2003/0105631 A1 * 6/2003 Habte ..................... G10L 15/26 704/235
2003/0122922 A1 7/2003 Saffer
2003/0126013 A1 7/2003 Shand
2003/0154112 A1 8/2003 Neiman et al.
2003/0220784 A1 11/2003 Fellenstein
2003/0223556 A1 12/2003 Ju
2004/0015973 A1 1/2004 Skovira
2004/0062365 A1 4/2004 Agraharam
2004/0172245 A1 * 9/2004 Rosen ................... G06F 40/174 704/235
2004/0204937 A1 * 10/2004 Zhang ..................... G10L 15/20 704/E15.039
2004/0252679 A1 12/2004 Williams
2005/0010411 A1 * 1/2005 Rigazio ................... G10L 15/26 704/E15.045
2005/0013419 A1 * 1/2005 Pelaez ..................... H04W 4/18 379/88.14
2005/0015443 A1 1/2005 Levine
2005/0028212 A1 2/2005 Laronne
2005/0058260 A1 3/2005 Lasensky
2005/0076109 A1 4/2005 Mathew
2005/0100142 A1 5/2005 Gandhi
2005/0102139 A1 * 5/2005 Fukada ................. G06F 16/685 707/E17.022
2005/0159949 A1 * 7/2005 Yu ......................... G10L 15/065 704/235
2005/0163289 A1 7/2005 Caspi
2005/0187766 A1 * 8/2005 Rennillo ................. G06F 40/58 704/235
2005/0288926 A1 12/2005 Benco
2006/0029197 A1 2/2006 Pham
2006/0047518 A1 * 3/2006 Claudatos ......... H04M 3/42221 707/E17.103
2006/0048157 A1 3/2006 Dawson et al.

(56) References Cited

U.S. PATENT DOCUMENTS

| | | | | |
|---|---|---|---|---|
| 2006/0095259 | A1 * | 5/2006 | Bahl | H04M 3/4936 704/235 |
| 2006/0123347 | A1 | 6/2006 | Hewitt | |
| 2006/0135128 | A1 | 6/2006 | Skoog | |
| 2006/0140360 | A1 | 6/2006 | Crago | |
| 2006/0143307 | A1 | 6/2006 | Codignotto | |
| 2006/0168259 | A1 | 7/2006 | Spilotro | |
| 2006/0193450 | A1 * | 8/2006 | Flynt | H04M 3/5307 379/88.13 |
| 2006/0223502 | A1 | 10/2006 | Doulton | |
| 2006/0234680 | A1 | 10/2006 | Doulton | |
| 2006/0245434 | A1 | 11/2006 | Wang | |
| 2006/0271365 | A1 | 11/2006 | Maes | |
| 2006/0287854 | A1 | 12/2006 | Smolenski | |
| 2007/0005709 | A1 * | 1/2007 | Johnson | G06Q 30/0269 709/206 |
| 2007/0041522 | A1 | 2/2007 | Abella | |
| 2007/0047702 | A1 | 3/2007 | Newell | |
| 2007/0050191 | A1 | 3/2007 | Weider | |
| 2007/0083656 | A1 | 4/2007 | Bobo, II | |
| 2007/0088808 | A1 | 4/2007 | Bobo, II | |
| 2007/0127640 | A1 | 6/2007 | Brunel | |
| 2007/0129949 | A1 | 6/2007 | Alberth, Jr. | |
| 2007/0156400 | A1 * | 7/2007 | Wheeler | G10L 15/30 704/E15.047 |
| 2007/0203901 | A1 | 8/2007 | Prado | |
| 2007/0208570 | A1 | 9/2007 | Bhardwaj | |
| 2007/0299664 | A1 * | 12/2007 | Peters | G06F 40/16 704/235 |
| 2008/0102863 | A1 | 5/2008 | Hardy | |
| 2008/0198981 | A1 | 8/2008 | Skakkebaek | |
| 2008/0221884 | A1 | 9/2008 | Cerra | |
| 2008/0300873 | A1 | 12/2008 | Siminoff | |
| 2009/0070109 | A1 | 3/2009 | Didcock | |
| 2009/0276215 | A1 | 11/2009 | Hager | |
| 2011/0022387 | A1 | 1/2011 | Hager | |
| 2011/0179134 | A1 | 7/2011 | Mayo et al. | |
| 2013/0197909 | A1 | 8/2013 | Hager | |
| 2014/0114658 | A1 | 4/2014 | Hager | |
| 2014/0136199 | A1 | 5/2014 | Hager | |
| 2016/0117310 | A1 | 4/2016 | Hager | |
| 2018/0081869 | A1 | 3/2018 | Hager | |

FOREIGN PATENT DOCUMENTS

| | | |
|---|---|---|
| GB | 2451371 | 1/2009 |
| WO | WO 1999015999 | 4/1999 |
| WO | WO2004/095422 | 11/2004 |
| WO | WO2007/121441 | 10/2007 |
| WO | WO2009/073768 | 9/2009 |

OTHER PUBLICATIONS

International Search Report and Written Opinion for Application No. PCT/US2008/085498 dated Apr. 16, 2009; 11 pages.

International Preliminary Report on Patentability for PCT/US2007/066791 dated Oct. 7, 2009; 6 pages.

Office Action from the United Kingdom Intellectual Property Office for Application No. 0819421.9 dated May 5, 2010; 2 pages.

International Preliminary Reporton Patentability for PCT/US2008/085498 dated Jun. 17, 2010; 8 pages.

SWW Listing of Related Cases, dated Jun. 6, 2019.

Stolowitz Ford Cowger LLP; Listing of Related Cases dated Jan. 20, 2016; 1 page.

Stolowitz Ford Cowger LLP; Listing of Related Cases dated Aug. 12, 2014; 2 pages.

Office Action from the United States Patent and Trademark Office for U.S. Appl. No. 13/803,733 dated Jun. 26, 2013 (19 pages).

Office Action from the United States Patent and Trademark Office for U.S. Appl. No. 12/746,352 dated Jul. 22, 2013 (17 pages).

Caesar et al., "Design and Implementation of a Routing Control Platform," Usenix, NSDI '05 Paper, Technical Program, obtained from the Internet, on Apr. 13, 2021, at URL <https://www.usenix.org/legacy/event/nsdi05/tech/full_papers/caesar/caesar_html/>, 23 pages.

Bader et al.; "Applications"; The International Journal of High Performance Computing Applications, vol. 15, No. ; pp. 181-185; Summer 2001.

Coomer et al.; "Introduction to the Cluster Grid—Part 1"; Sun Microsystems White Paper; 19 pages; Aug. 2002.

Joseph et al.; "Evolution of grid computing architecture and grid adoption models"; IBM Systems Journal, vol. 43, No. 4; 22 pages; 2004.

Smith et al.; "Grid computing"; MIT Sloan Management Review, vol. 46, Iss. 1.; 5 pages; Fall 2004.

"Microsoft Computer Dictionary, 5th Ed."; Microsoft Press; 3 pages; 2002.

"Random House Concise Dictionary of Science & Computers"; 3 pages; Helicon Publishing; 2004.

* cited by examiner

255

| FROM | SUBJECT |
|---|---|
| TRANSCRIPTION SERVER | NEW MESSAGE FOR ACCOUNT NUMBER: 305 FROM "LACKNER HENRY" <6084671992> |
| JENNIFER JONES | FIRE DRILL TONIGHT AT 5:00PM |
| TRANSCRIPTION SERVER | NEW MESSAGE FOR ACCOUNT NUMBER: 305 FROM "LACKNER HENRY" <6084671992> |

From: Transcription Server <name@url.com>
To: June Daily <june.daily@acme.com>
Subject: New message for account number: 305 from "Lackner Henry" <6084671992>
Date: Sat, 3 Mar 2007 08:05:30 +0000

June Daily,

There is a new file available for account number: 305:

From:   "Lackner Henry" <6084671992>
Length: 0.49 seconds
Date:   Wednesday, February 28, 2007 at 03:10:59 PM To read the transcription of this message and listen to your message online, go to:
https://www.url.com/loginpage.aspx

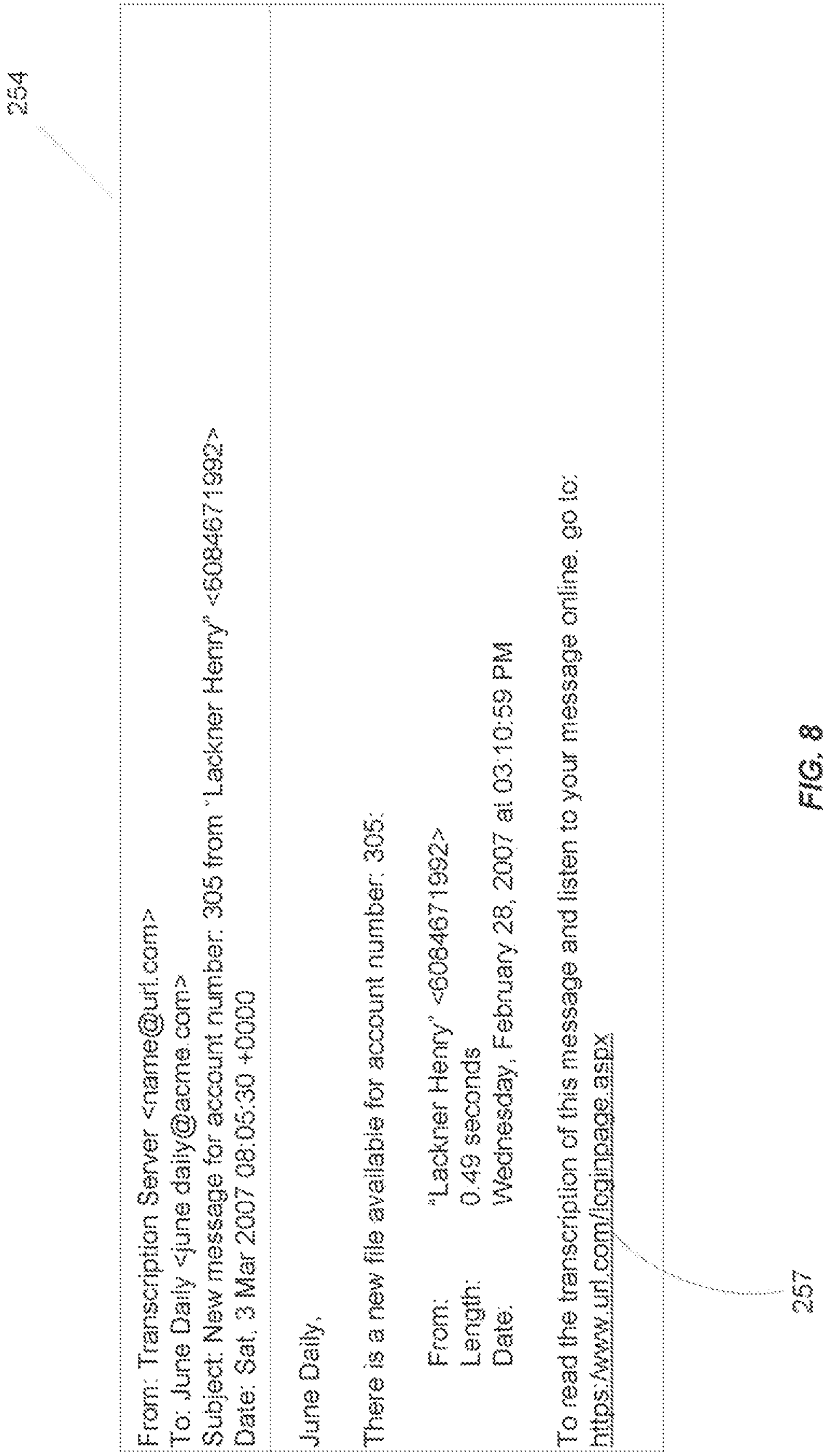

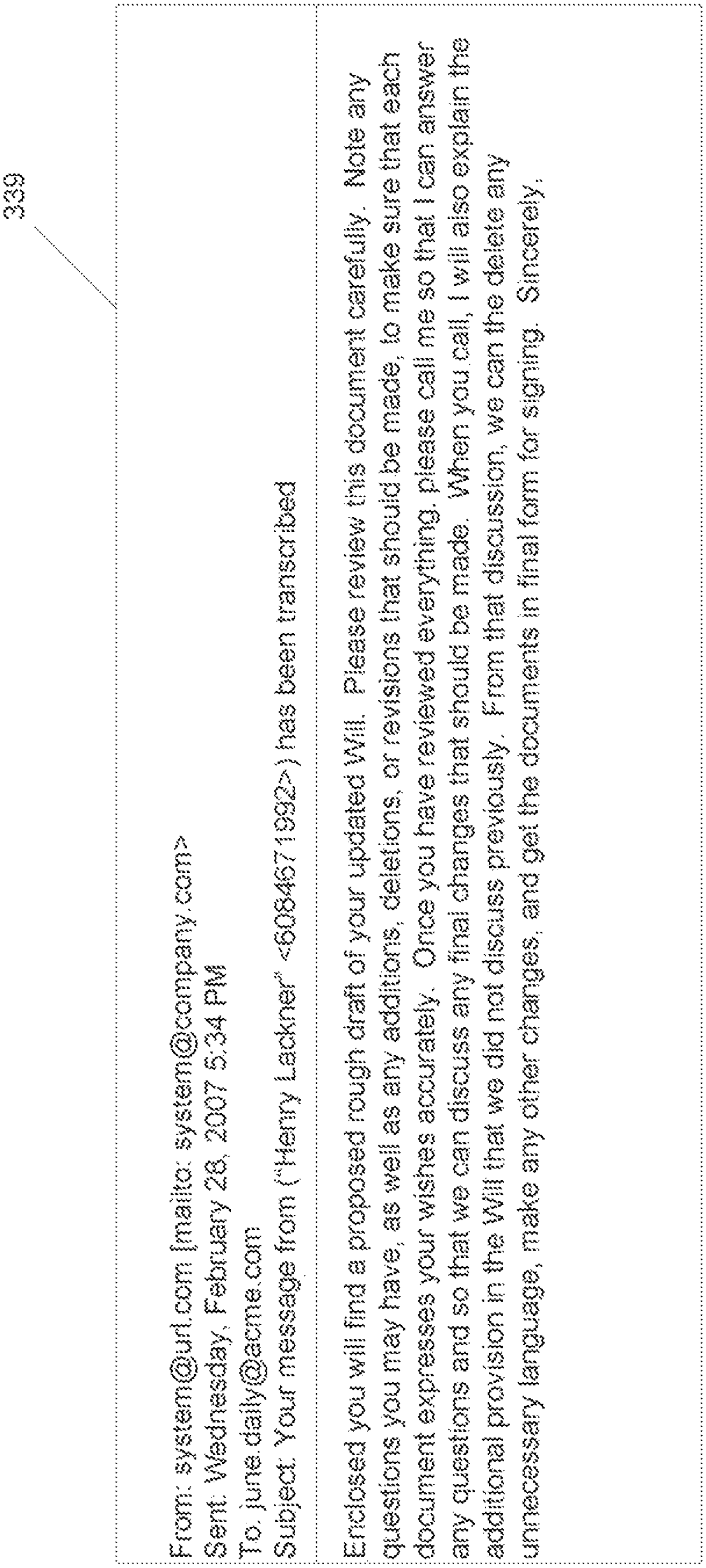

From: system@url.com [mailto: system@company.com>
Sent: Wednesday, February 28, 2007 5:34 PM
To: june.daily@acme.com
Subject: Your message from ("Henry Lackner" <6084571992>) has been transcribed Enclosed you will find a proposed rough draft of your updated Will. Please review this document carefully. Note any questions you may have, as well as any additions, deletions, or revisions that should be made, to make sure that each document expresses your wishes accurately. Once you have reviewed everything, please call me so that I can answer any questions and so that we can discuss any final changes that should be made. When you call, I will also explain the additional provision in the Will that we did not discuss previously. From that discussion, we can the delete any unnecessary language, make any other changes, and get the documents in final form for signing. Sincerely,

FIG. 13

METHODS AND SYSTEMS FOR CORRECTING TRANSCRIBED AUDIO FILES

RELATED APPLICATIONS

This application is a continuation of U.S. patent application Ser. No. 15/826,110, filed Nov. 29, 2017, which is a divisional of U.S. patent application Ser. No. 14/981,243, filed Dec. 28, 2015 (now U.S. Pat. No. 9,858,256), which is a continuation of U.S. patent application Ser. No. 14/138,609, filed Dec. 23, 2013 (now U.S. Pat. No. 9,245,522), which is a continuation of U.S. patent application Ser. No. 13/803,733, filed Mar. 14, 2013 (now abandoned), which is a continuation of U.S. patent application Ser. No. 12/278,332, filed Aug. 5, 2008 (now U.S. Pat. No. 8,407,052), which is an application filed under 35 U.S. C. § 371 from International Application No. PCT/US2007/066791, filed Apr. 17, 2007, which claims priority to U.S. Provisional Application No. 60/792,640, filed Apr. 17, 2006, the contents of which are each incorporated by reference herein.

BACKGROUND

Each day individuals and companies receive multiple voice or audio messages. These voice messages can include personal greetings and information or business-related instructions and information. In either case, it may be useful or required that the voice messages be transcribed in order to create written records of the messages. For example, vendors may create paper versions of orders placed via voice messages, lawyers may create paper copies of messages received from clients, and federal agencies may create paper copies of voice messages for public records. In each situation, it is generally important that voice messages be transcribed correctly.

Software currently exists that generates written text based on audio data. For example, Nuance Communications, Inc. provides a number of software programs, trademarked "Dragon," that take audio files in .WAV format, .MP3 format, or other audio formats and translate such files into text files. The Dragon software also provides mechanisms for comparing audio files to text files in order to "learn" and improve future transcriptions. The "learning" mechanism included in the Dragon software, however, is only intended to learn based on a voice dependent model, which means that the same person trains the software program over time. In addition, learning mechanisms in existing transcription software are often non-continuous and include set training parameters that limit the amount of training that is performed.

SUMMARY OF THE INVENTION

Embodiments of the present invention provide methods and systems for correcting transcribed text. One method includes receiving audio data from one or more audio data sources and transcribing the audio data based on a voice model to generate text data. The method also includes making the text data available to a plurality of users over at least one computer network and receiving corrected text data over the at least one computer network from the plurality of users. In addition, the method includes modifying the voice model based on the corrected text data.

Embodiments of the present invention also provide systems for correcting transcribed text. One system includes a transcription server, at least one translation server, a correction interface, and at least one training server. The transcription server receives audio data from one or more audio data sources and the translation server can transcribe the audio data based on a voice model to generate text data. The correction interface is accessible by a plurality of users over at least one computer network and provides the plurality of user access to the text data. The correction interface also receives corrected text data from the plurality of users. The training server modifies the voice model based on the corrected text data.

Additional embodiments of the invention also provide methods of performing audio data transcription. One method includes obtaining audio data from at least one audio data source, transcribing the audio data based on a voice-independent model to generate text data, and sending the text data to an owner of the audio data as an e-mail message.

BRIEF DESCRIPTION OF THE DRAWINGS

In the drawings:

FIGS. 7-8 illustrate a correction notification according to an embodiment of the invention.

FIG. 13 illustrates a message notification according to an embodiment of the invention.

DETAILED DESCRIPTION

Figure 1:
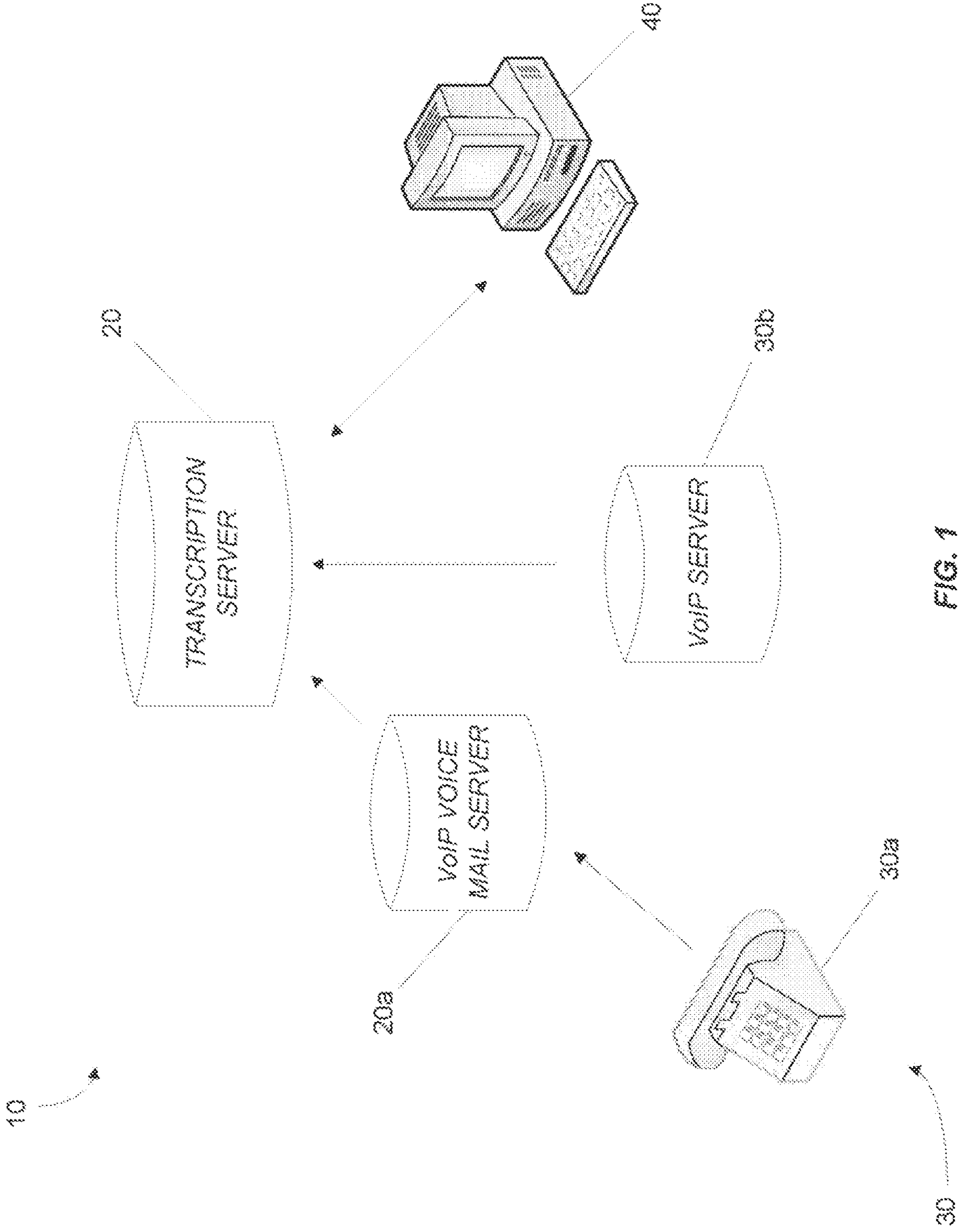
FIGS. 1 and 2 schematically illustrate systems for transcribing audio data according to various embodiments of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

In addition, it should be understood that embodiments of the invention include hardware, software, and electronic components or modules that, for purposes of discussion, may be illustrated and described as if the majority of the components were implemented solely in hardware. However, based on a reading of this detailed description, one of ordinary skill in the art would recognize that, in at least one embodiment, the electronic based aspects of the invention may be implemented in software. As such, it should be noted that a plurality of hardware and software based devices, as well as a plurality of different structural components, may be utilized to implement the invention. Furthermore, and as described in subsequent paragraphs, the specific configurations illustrated in the drawings are intended to exemplify embodiments of the invention. Other alternative configurations are possible.

FIG. 1 illustrates a system 10 for transcribing audio data according to an embodiment of the invention. As shown in FIG. 1, the system 10 includes a transcription server 20, one or more audio data sources 30, illustrated as a telephone 30*a* or a voice-over-IP ("VoIP") server 30*b* and a client computer 40. The audio data sources 30 can be connected to the transcription server 20 via wired or wireless connections, such as a telephone line or a network (e.g., the Internet).

In some embodiments, an audio data source 30 is connected to the transcription server 20 through a VoIP voice mail server 20*a*. For example, a user operating a telephone 30*a* dials an individual voice mail box associated with the VoIP voice mail server 20*a* and leaves a message (i.e., audio data). The VoIP voice mail server 20*a* converts the received message to a format recognizable and useable to the transcription server 20 (if necessary), and the VoIP voice mail server 20*a* transmits the message to the transcription server 20. It should be understood that, in some embodiments, the functionality of the VoIP voice mail server 20*a* is combined with the functionality of the transcription server 20 and is provided in a single server or device.

As shown in FIG. 1, the transcription server 20 can also directly receive audio data from a VoIP server 30*b*. The VoIP server 30*b* operates similar to the VoIP voice mail server 20*a*, as described above, and receives and stores audio data. In some embodiments, software and/or hardware installed in the VoIP server 30*b* securely transmits messages (i.e., audio data) to the transcription server 20.

Figure 2:
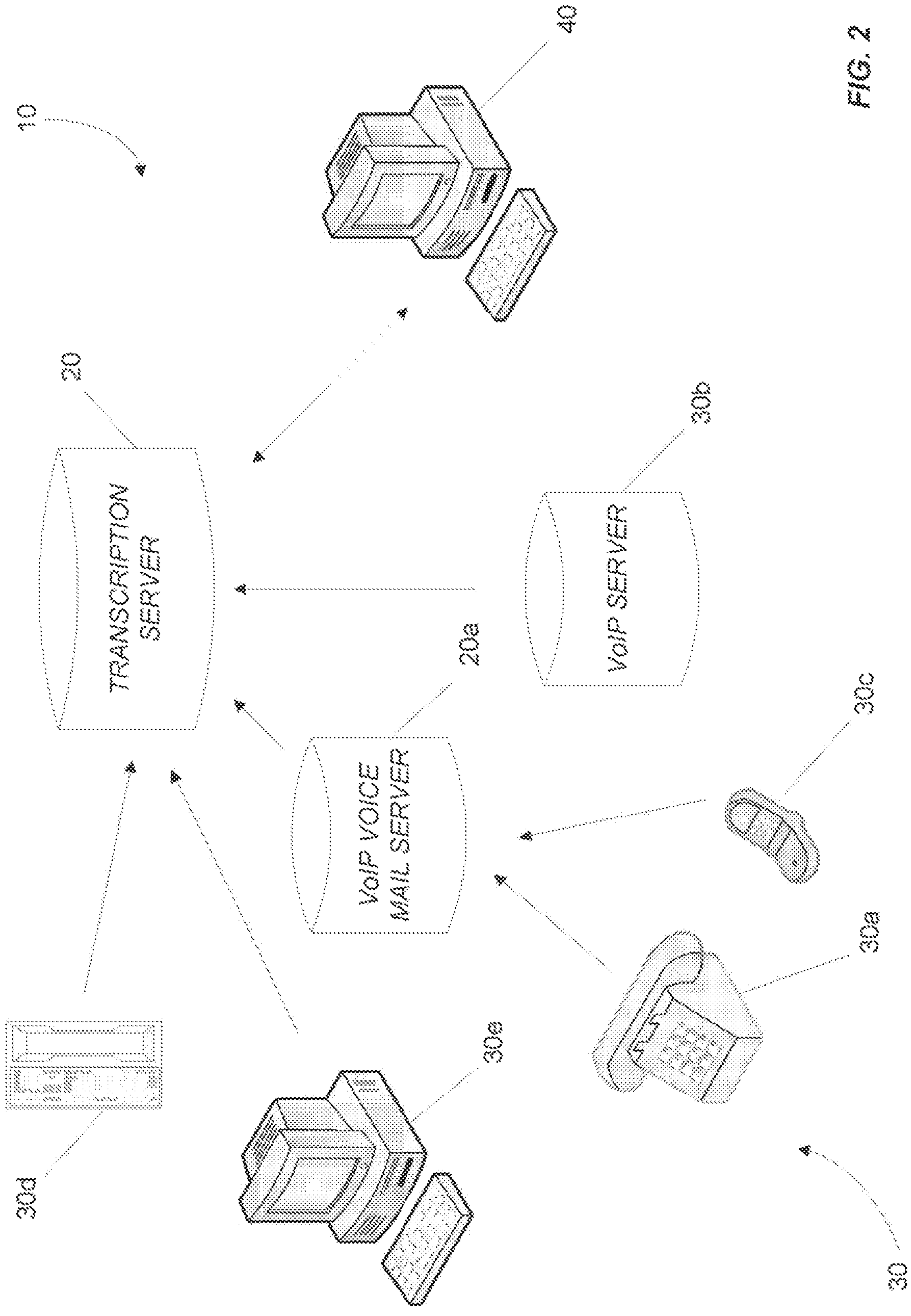

As shown in FIG. 2, the transcription server 20 can obtain audio data from various audio data sources 30. For example, the transcription server 20 can obtain audio data from a mobile phone 30*c* that dials the VoIP mail server 20*a* and/or sends a message to a short message service ("SMS") server included in or connected to the transcription serer 20. The transcription server 20 can also obtain audio data from a teletype ("TTY") phone 30*d*.

In addition, the transcription server 20 can obtain audio data from a client computer 30*e*. For example, a user of the client computer 30*e* can upload audio files stored on or accessible by the client computer 30*e* to the transcription server 20. In some embodiments, a user uses a recording application stored on or accessible by the client computer 30*e* to create audio files to be uploaded to the transcription server 20. The client computer 30*e* can upload the audio files to the transcription server 20 using various formats and/or protocols, such as the file transfer protocol ("FTP").

A user can also e-mail an audio file to the transcription server 20. For example, the transcription server 20 can include or can be connected to an e-mail server that receives e-mail messages from the client computer 30*e* or other e-mail processing devices, such as personal digital assistants ("PDAs") and hand-held communication devices (e.g., a cellular phone, a Blackberry device, etc.), and a user can forward or send an e-mail message that contains audio data to an e-mail address associated with the transcription server 20.

It should also be noted that, in some embodiments, the transcription server 20 obtains audio data from a TTY phone 30*d* or from a client computer 30*e* via a VoIP server 20*a*. In addition, the system 10 can allow a user involved in a telephone call to enter a code (e.g., via a keypad of the telephone) that initiates recording of the current telephone call by the transcription server 20 or another device of the system 10. For example, a user can enter a telephone number associated with a transcription server 20 or another device of the system 10 that "conferences in" the device so that the device obtains a substantially real-time stream of the audio of the telephone call. The device records the audio of the telephone call and creates corresponding audio data (e.g., one or more audio files).

The transcription server 20 or another device of the system 10 can also initiate a call to an external voicemail server and record voicemail messages stored by the voicemail server in order to obtain audio data for transcription. For example, the system 10 can provide an interface (e.g., a settings interface or website) that enables a user to provide a telephone number of a voicemail system and/or a telephone number (e.g., a cellular phone number), a voicemail passcode or password, and, optionally, a schedule for calling the voicemail server to record voicemail messages. The interface can also enable a user to manually initiate a call to the voicemail server. In addition, the interface can enable a user to listen to the voicemail messages as or before the transcription server 20 records and/or transcribes them. In some embodiments, the interface also enables a user to select which voicemails the transcription server 20 should transcribe.

Figure 3:
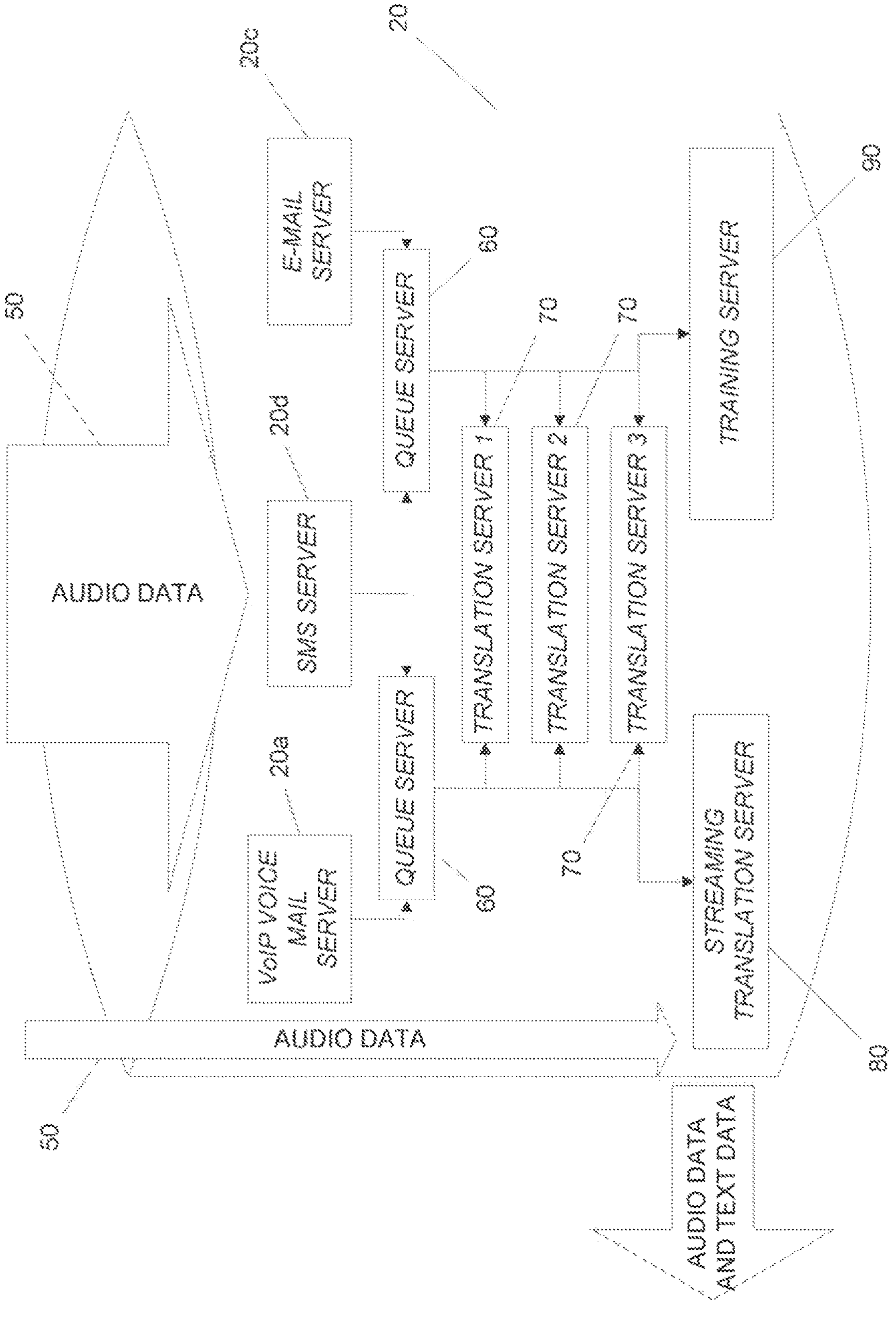
FIG. 3 illustrates the transcription server of FIGS. 1 and 2 according to an embodiment of the invention.

As shown in FIG. 3, the transcription server 20 receives audio data 50 from one or more of the audio data sources 30. In some embodiments, as noted above, the transcription server 20 includes or is connected to one or more intermediary servers or devices (e.g., the VoIP server 20*a*, a short message server ("SMS") server 20*b*, an e-mail server 20*c*, and the like) that receive messages from the audio data sources 30. The messages can be received continuously or in batch form, and can be sent to the transcription server 20 and/or pulled by the transcription server 20 in any manner (e.g., continuously, in batch form, and the like). For example, in some embodiments, the transcription server 20 is adapted to request messages at regular intervals and/or to be responsive to a user command or to some other event. In some embodiments, rather than immediately transmitting the converted message(s) to the transcription server 20, the audio data sources 30 and/or any intermediary servers store the converted message(s) until requested by the transcription server 20 or a separate polling computer. By requesting messages from the audio data sources 30 and/or any intermediary servers, the transcription server 20 or the separate polling computer can manage the messages. For example, in one implementation, the transcription server 20 or a separate polling computer establishes a priority for received messages to be transcribed. The transcription server 20 or a separate polling computer also determines a source of a received message (e.g., the audio data source 30 that transmitted the message). For example, the transcription server 20 or separate polling computer can use an IP address of the audio data source 30 providing the message to identify the source of a particular message. Still other types of identifying data can be used to identify the source of a received message.

Once the transcription server 20 or separate polling computer receives one or more messages (received by request or otherwise), the transcription server 20 or separate polling computer places the messages into one or more queue servers or applications 60. The queue servers 60 look for an open or available processor or translation server 70. As shown in FIG. 3, the transcription server 20 includes multiple translation servers 70, although any number of translation servers 70 (e.g., physical or virtual) are possible, and fall within the spirit and scope of the present invention. Upon identifying an available translation server 70, the queue servers 60 route a message to the available translation server 70. The translation server 70 transcribes the message to generate text data, and in some embodiments indexes the message. The translation servers 70 index the messages using a database to identify discrete words. For example, the translation server 70 can use an extensible markup language ("XML"), structured query language ("SQL"), mySQL, idx, or other database language to identify discrete words or phrases within the message.

In addition to transcribing messages as just described, some embodiments of a translation server 70 generate an index of keywords based upon the transcribed text. For example, in some embodiments, the translation server 70 removes those words that are less commonly searched and/or less useful for searching (e.g., I, the, a, an, but, and the like) from messages, which leaves a number of keywords that can be stored in memory available to the translation servers 70. The resulting "keyword index" includes the exact positions of each keyword in the transcribed text, and, in some cases, includes the exact location of each keyword in the corresponding audio message. This keyword index enables users to perform searches on the transcribed text of the message. For example, a user accessing the transcribed text of a message (whether for purposes of correcting any errors in the transcribed text or for searching within the transcribed text) can select one or more words from the keyword index of the message generated earlier. In so doing, the exact locations (e.g., page and/or line numbers) of such words can be provided quickly and efficiently—in many cases significantly faster and with less processing power than performing a standard search for the word through the entire text of the message. The system 10 can provide the keyword index to a user in any suitable manner, such as in a pop-up or pull-down menu included in an interface of the system 10 accessed by a user via a client computer 40 during text correction or searching of a transcribed message (described below).

Also, in some embodiments, a translation server 70 generates two or more possible candidates for a transcription of a spoken word or phrase from an audio message. The most likely candidate is displayed or otherwise used to generate the transcribed message, and the less likely candidate(s) are saved in a memory accessible by the translation server 70 and/or by another server or client computer 40 as needed. This capability can be useful, for example, during correction of the transcribed message (described below). In particular, if a word in the transcribed message is wrong, a user can obtain other candidate(s) identified by the translation server 70 during transcription, which can speed up and/or simplify the correction process.

Once a message is transcribed, the system 10 can allow a user to search a message for particular words and/or phrases. This searching capability can be used during correction of a transcribed message as described below or when the file is searched for particular words (whether a search for such words is performed on the file alone or in combination with one or more other files). For example, using the indexed message, a user viewing generated text data can select a word or phrase included in the text data and, in some embodiments, can hear the corresponding portion of the audio data from which the text data was generated. In some embodiments, the system 10 is adapted to enable a user to search some or all transcribed files accessible by the transcription server 20, regardless of whether such files have been corrected. Also, the system 10 can enable a user to search transcribed messages using Boolean and/or other search terms.

Search results can be generated in a number of manners, such as in table form enabling a user to select one or more files in which a word or phrase has been found and/or one or more locations at which a word or phrase has been found in a particular message. The search results can also be sorted in one or more manners according to one or more rules (e.g., date, relevance, number of instances in which the word or phrase has been found in a message, and the like) and can be printed, displayed, or exported as desired. In some embodiments, the search results also provide the text around the found word or phrase. The search results can also include additional information, such as the number of instances in which a word or phrase has been found in a file and/or the number of files in which a word or phrase has been found.

In the embodiment shown in FIG. 3, the transcription server 20 includes a streaming translation server 80. In some embodiments, the transcription server 20 routes audio data 50 received from particular audio data sources 50, such as a TTY phone 30*d* (or any other audio data source 30), directly to the streaming translation server 80. The streaming translation server 80 provides substantially real-time transcription of audio data 50 and provides the generated text data and/or the audio data 50 to one or more devices, such as the TTY phone 30*d* or the client computer 40.

After the translation servers 70 index and translate audio data, the audio data and/or the generated text data is stored. The audio data and text data can be stored internally by the transcription server 20 or can be stored externally to one or more data storage devices (e.g., databases, servers, and the like). In some embodiments, a user (e.g., a user associated with a particular audio data source 30) decides how long audio data and/or text data is stored by the transcription server 20, after which time the audio data and/or text data can be automatically deleted, over-written, or stored in another storage device (e.g., a relatively low-accessibility mass storage device). An interface of the system 10 (e.g., a settings interface or website) enables a user to specify a time limit for audio data and/or text data stored by the transcription server 20.

As shown in FIGS. 1 and 2, a client computer 40 connects to the transcription server 20 over a network, such as the Internet, one or more local or wide-area networks, or the like, in order to obtain audio data and/or corresponding, generated text data. A user uses the client computer 40 to access an interface (e.g., a website) associated with transcription server 20 to obtain generated text data and or corresponding audio data. For example, using the interface, the client computer 40 can request particular audio data and/or the corresponding text data. The requested data is obtained from the transcription server 20 and/or a separate data storage device and is transmitted to the client computer 40 for display via the interface. As noted above, the streaming translation server 80 can provide the generated text data and streaming audio data to the client computer 40 over a network, such as the Internet.

In some embodiments, the transcription server 20 sends audio data and/or corresponding, generated text data to a user as an e-mail message. The transcription server 20 can send an e-mail message to a user that includes the audio data and the text data as attached files. In other embodiments, the transcription server 20 sends an e-mail message to a user that includes a notification that audio data and/or text data is available for the user. The e-mail message can also include a link to the available audio data and/or text data. A user selects the link in order to listen to the audio data, view the text data, and/or to correct the text data. For example, a user selects the link included in the e-mail message in order to be transferred to a correction interface of the system 10, as described below with respect to FIGS. 9-12, that enables a user to correct text data.

As described above, an e-mail message that includes an attached audio file is a possible source of audio data. If a user forwards or sends an e-mail message to the transcription server 20 that includes audio data, the transcription server 20 can send a return e-mail message to the user after the transcription server 20 transcribes the submitted audio file. The e-mail message can inform the user that the submitted audio data was transcribed and that corresponding text data is available. As previously noted, the e-mail message from the transcription server 20 can include the submitted audio data and/or the generated text data. Alternatively or in addition, the e-mail message from the transcription server 20 includes a link to the audio data, the generated text data, and/or an interface for listening to the audio data, viewing the text data, and/or correcting the text data.

In some embodiments, the system 10 sends audio data and/or corresponding text data to one or more predetermined destinations (e.g., a system, a data storage device, a file, etc.), any or all of which can be specified by a user of the system 10. For example, an interface of the system 10 (e.g., an administration interface or website) can enable a user to specify destination settings for audio data and/or text data. Using the interface, a user can specify a website, a blog, a document management or electronic medial record ("EMR") system, an e-mail address, a remote printer, etc. where audio data and/or corresponding generated text data should be automatically sent (e.g., after being corrected). The destination settings can be set for individual users or groups of users (e.g., users with certain permissions).

The system 10 can also enable a user to use to provide destination settings for audio data and/or text data on a per-generated-text-data basis. In some embodiments, before or after audio data is transcribed, a user specifies a particular destination for the text data (e.g., from a drop down selection mechanism, a menu selection mechanism, or an input mechanism of the correction interface). Similarly, certain implementations allow a user to specify destination settings in an e-mail message. For example, if a user sends an e-mail message to the transcription server 20 that includes audio data, the user can specify destination information in the e-mail message. When a caller leaves a voice message (e.g., with the VoIP mail server 20*a*), the system 10 can also allow the caller to enter a code to designate a destination for the audio message and/or the generated text data. For example, a user can enter a number "4" (e.g., via a keypad of a telephone) to designate that the audio message and/or the generated text data should be delivered to a recipient via an e-mail message. The user can also enter an identifier of the recipient (e.g., a phone number, an e-mail address, etc.) who is to receive the audio data and/or the generated text data. For example, one or more speed dials can be established, and a user can enter a speed dial number after entering the destination code in order to identify a particular recipient. The speed dial numbers can be programmed via an interface of the system 10 (e.g., a settings interface or website). After the audio message is transcribed and the generated text data is corrected (if applicable), the transcription server 20 can send an e-mail message to the identified recipient (e.g., via a SMTP server).

In some embodiments, to protect the privacy and security of the audio and text data, the transcription server 20 transmits data (e.g., audio data and/or text data) to the client computer 40 or another destination device using file transfer protocol ("FTP"). The transmitted data can also be protected by a secure socket layer ("SSL") mechanism (e.g., a bank level certificate).

As noted above, the system 10 can include a correction interface and a streaming translation server 80 that a user can access (e.g., via the client computer 40) to view generated text. As described below with respect to FIG. 11, in some embodiments, the correction interface and the streaming translation server 80 also enable a user to stream the entire audio data corresponding to the generated text data and/or to stream any desired portion of the audio data corresponding to selected text data. For example, the correction interface and the streaming translation server 80 enables a user to select (e.g., click-on, highlight, mouse over, etc.) a portion of the text in order to hear the corresponding audio data. In addition, in some embodiments, the correction interface and the streaming translation server 80 enable a user to specify a number of seconds that the user desires to hear before and/or after a selected portion of text data.

The correction interface also enables a user to correct generated text data. For example, if a user listens to audio data and determines that a portion of the corresponding generated text data is incorrect, the user can correct the generated text data via the correction interface. In some embodiments, the correction interface automatically identifies potentially incorrect portions of generated text data. For example, the correction interface can display potentially incorrect portions of die generated text data in a particular color or other format (e.g., via a different font, highlighting in bold, italics, underline, or any other manner). Furthermore, the correction interface can display portions of the generated text in various colors or other formats depending on the confidence that the portion of the generated text is correct. The correction interface can also insert a placeholder (e.g., an image, an icon, etc.) into text that marks portions of the generated text where text is missing (i.e., the transcription server 20 could not generate text based on the audio data). A user can select the placeholder in order to hear the audio data corresponding to the missing text and can insert the missing text accordingly.

In order to assist a user in correcting generated text data, some embodiments of the correction interface automatically generate words similar to incorrectly-generated words. In this regard, a user selects a word (e.g., by highlighting, clicking, or by any other suitable manner) within generated text data that is or appears to be incorrect. Upon such selection, the correction interface suggests similar words, such as in a pop-up menu, pull-down menu, or in any other format. The user selects a word or words from the list of suggested words in order to make a desired correction.

In some embodiments, the correction interface provides audio data and/or text data in particular formats. For example, court reporters require certain statutory formatting of their documents that identify the speaker. The correction interface (e.g., when placed in "court" mode) enables a user to input speaker names for particular audio data and/or to insert corresponding symbols for each speaker name into the text data. The user then selects a "format" selection mechanism (e.g., a button, a radio button, a drop-down menu item, or the like) included in the correction interface, and the correction interface reformats the displayed text data using the provided speaker names and format guidelines.

In some embodiments, the translation server(s) 70 are configured to automatically determine speakers in an audio file. For example, the translation server 70 can process audio files for drastic changes in voice or audio patterns. The translation server 70 then analyzes the patterns in order to identify the number of individuals or sources speaking in an audio file. In other embodiments, a user or information associated with the audio file (e.g., information included in the e-mail message containing the audio data, or stored in a separate text file associated with the audio data) identifies the number of speakers in an audio file before the audio file is transcribed. For example, a user can use an interface of the system 10 (e.g., the correction interface) to specify the number of speakers in an audio file before or after the audio file is transcribed.

After identifying the number of speakers in an audio file, the translation server(s) 70 can generate a speaker list that marks the number of speakers and/or the times in the audio file where each speaker speaks. The translation server(s) 70 can use the speaker list when creating or formatting the corresponding text data to provide markers or identifiers of the speakers (e.g., Speaker 1, Speaker 2, etc.) within the generated text data. In some embodiments, a user can update the speaker list in order to change the number of speakers included in an audio file, change the identifier of the speakers (e.g., to the names of the speakers), and/or specify that two or more speakers identified by the translation server(s) 70 relate to a single speaker or audio source. Also, in some embodiments, a user can use an interface of the system 10 (e.g., a settings interface or website) to modify the speaker list or to upload a new speaker list. For example, a user can change the identifiers of the speakers by updating a field of the correction interface that identifies a particular speaker. For example, each speaker identifier displayed within generated text data can be placed in a user-editable field. In some embodiments, changing an identifier of a speaker in one field automatically changes the identifier for the speaker throughout the generated text data.

In some embodiments, the system 10 can also format transcribed text data based on one or more templates, such as templates adapted for particular users or businesses (e.g., medical, legal, engineering, or other fields). For example, after generating text data, the system 10 (e.g., the translation server(s) 70) can compare the text data with one or more templates. If the format or structure of the text data corresponds to the format or structure of a template and/or if the text data includes one or more keywords associated with a template, the system 10 can format the text data based on the template. For example, if the system 10 includes a template specifying the following format:

Date:

Type of Illness:

and text data generated by the system 10 is "the date today is Sep. the 12$^{th}$ the year 2007, the illness is flu," the system 10 can automatically apply the template to the text data in order to create the following formatted text data:

Date: 9/12/07

Type of Illness: Flu

In some embodiments, the system 10 is configured to automatically apply a template to text data if text data corresponds to the template. Therefore, as the system 10 "learns" and improves its transcription quality, as described below, the system 10 also "learns" and improves its application of templates. In other embodiments, a user can use an interface of the system 10 (e.g., the correction interface) to manually specify a template to be applied to text data. For example, a user can select a template to apply to text data from a drop down menu or other selection mechanism included in the interface.

The system 10 can store the formatted text data and can make the formatted text data available for review and correction, as described below. In some embodiments, the system 10 also stores or retains the unformatted text data separately from the formatted text data. By retaining the unformatted text data, the text data can be applied to new or different templates. In addition, the system 10 can use the unformatted text data to train the system 10, as described below.

The system 10 can include one or more predefined templates. In some embodiments, a user can also create a customized template and can upload the template to the system 10. For example, a user can use a word processing application, such as Microsoft® Word®, to create a text file that defines the format and structure of a customized template. The user can upload the text file to the system 10 using an interface of the system 10 (e.g., the correction interface). In some embodiments, the system 10 reformats uploaded templates. For example, the system 10 can store predefined templates and/or customized templates in a mark-up language, such as XML or HTML.

Templates can be associated with a particular user or a group of users. For example, only users with certain permission may be allowed to use or apply particular templates. In other embodiments, a user can upload one or more templates that only he or she can use or apply. Settings and restrictions for predefined and/or customized templates can be configured by a user or an administrator using an interface of the system 10 (e.g., a settings interface or website).

In some embodiments, alternatively or in addition to configuring templates, the system 10 can also enable a user to configure one or more commands that replace transcribed text with different text. For example, a user can configure the system 10 to insert the current date into text data any time audio data and/or corresponding text data includes the word "date" or the phrases "today's date," "current date," or "insert today's date." Similarly, a user can configure the system 10 to start a new paragraph within transcribed text data each time audio data and/or corresponding text data includes the word "paragraph," the phrase "new paragraph," or a similar identifier. The commands can be defined on a per user basis and/or on a group of users basis, and settings or restrictions for the commands can be set by a user or an administrator using an interface of the system 10 (e.g., a settings interface or website).

Some embodiments of the system 10 also enable a user correcting text data via the correction interface to create commands and/or keyboard shortcuts. For example, the user can use the commands and/or keyboard shortcuts to stream audio data, add common words or phrases to text data, play audio data, pause audio data, or start or select objects or functions provided through the correction interface or other interfaces of the system 10. In some embodiments, a user uses the correction interface (e.g., a settings interface or website) to configure the commands and/or keyboard shortcuts. The commands and/or keyboard shortcuts can be stored on a user level and/or a group level. An administrator can also configure commands and/or keyboard shortcuts that can be made available to one user or multiple users. For example, users with particular permissions may be allowed to use particular commands and/or keyboard shortcuts. In addition, in some embodiments, a user can connect an input device to the client computer 40, such as a foot pedal, a joystick, or a microphone, that the user can use to send commands to the correction interface. For example, a user can select a word or phrase in the text data (e.g., via a keyboard or a mouse connected to the client computer 40) in order to start playing the corresponding audio data and then can use the foot pedal or other input device to more forward or backward within the audio data, pause the audio data, play the audio data, insert common words or phrases into the text data, etc.

If a user uses a microphone as an input device, the correction interface can be configured to react to commands spoken by the user. For example, the system 10 can enable a user to create commands that when spoken by the user causes the correction interface to perform certain actions. In some embodiments, the user can say "play," "pause," "forward," "backward," etc. to control the playing of the audio data by the correction interface. A user can also say commands that cause the correction interface to insert, delete, or edit text in transcribed text data. For example, a user can say "date," and the correction interface can insert date information into transcribed text data.

In some embodiments, the system 10 also performs translations of transcribed text data. For example, the correction interface or another interface of the system 10 can enable a user to request a translation of transcribed text data into another language. The transcription server 20 can include one or more language translation modules configured to create text data in a particular language based on generated text data in another language. An audio source (e.g., a caller to a voicemail box or an individual submitting an e-mail message with an attached audio file to the transcription server 20) can also request or specify a language translation when an audio file is submitted to the transcription server 20.

With continued reference to the illustrated embodiment of FIG. 3, corrections made by a user through the correction interface are transmitted to the transcription server 20. As shown in FIG. 3, the transcription server 20 includes a training server 90. The training server 90 can use the corrections made by a user to "learn" so that future incorrect translations are avoided. In some embodiments, since audio data is received from one or more audio data sources 30 representing multiple "speakers," and since the correction interface can be accessible over a network by multiple users, the training server 90 receives corrections from multiple users and, therefore, uses a voice independent model to learn from multiple speakers or audio data sources.

In some embodiments, the system 10 transcribes audio files of a predetermined size (e.g., over 20 minutes in length) in pieces in order to "pre-train" the translation server(s) 70. For example, the transcription server 20 and/or the translation server(s) 70 can divide an audio file into segments (e.g., 1 to 5 minute segments). The translation server(s) 70 can then transcribe one or more of the segments and the resulting text data can be made available to a user for correction (e.g., via the correction interface). After the transcribed segments are corrected and any corrections are applied to the training server 90 in order to "teach" the system 10, the translation server(s) 70 transcribe the complete audio file. After the complete audio file is transcribed, the transcription of the complete audio file is made available to a user for correction. Using the small segments of the audio file to pre-train the translation server(s) 70 can increase the accuracy of the transcription of the complete audio file, which can save time and can prevent errors. In some embodiments, the complete audio file is transcribed before or in parallel with one or more smaller segments of the same audio file. Once the complete audio file is transcribed, a user can then immediately review and correct the text for the complete audio file or can wait until the individual segments are transcribed and corrected before correcting the text of ihe complete audio file. In addition, a user can request a re-transcription of the complete audio file after one or more individual segments are transcribed and corrected. In some embodiments, if the complete audio file is transcribed before or in parallel with smaller segments and the transcription of the complete audio file has not been corrected by the time the individual segments are transcribed and corrected, the transcription server 20 and/or the translation server(s) 70 automatically re-transcribes the complete audio file.

The voice independent model developed by the transcription server 20 can be shared and used by multiple transcription servers 20. For example, in some embodiments, the voice independent model developed by a transcription server 20 can be copied to or shared with other transcription servers 20. The model can be copied to other transcription servers 20 based on a predetermined schedule, anytime the model is updated, on a manual basis, etc. In some embodiments, a lead transcription server 20 collects audio and text data from other transcription servers 20 (e.g., audio and text data which has not been applied to a training server) and transfers the data to a lead training server 90. The lead transcription server 20 can collect the audio and text data during periods of low network or processor usage. The individual training servers 90 of one or more transcription servers 20 can also take turns processing batches of audio data and copying updated voice models to other transcription servers 20 (e.g., in a predetermined sequence or schedule), which can ensure that each transcription server 20 is using the most up-to-date voice model.

In some embodiments, individuals may be hired to correct transcribed audio files ("correctors"), and the correctors may be paid on a per-line, per-word, per-file, time, or the like basis, and the transcription server 20 can track performance data for the correctors. The performance data can include line counts, usage counts, word counts, etc. for individual correctors and/or groups of correctors. In some embodiments, the transcription server 20 enables a user (e.g., an administrator) to access the performance data via an interface of the system 10 (e.g., a website). The user can use the interface to input personal information associated with the performance data, such as the correctors' names, employee numbers, etc. In some embodiments, the user can also use the interface to initiate and/or specify payments to be made to the correctors. The performance data (and any related information provided by a user, such as an administrator) can be stored in a database and/or can be exported to an external accounting system, such as accounting systems and solutions provided by Paychex, Inc. or QuickBooks® provided by Intuit, Inc. The transcription server 20 can send the performance data to an external accounting system via a direct connection or an indirect connection, such as the Internet. The transcription server 20 can also generate a file that can be stored to a portable data storage medium (e.g., a compact disk, a jump drive, etc.). The file can then be uploaded to an external accounting system from the portable data storage medium. An external account system can use the performance data to pay the correctors, generate financial documents, etc.

In some embodiments, a user may not desire or need transcribed text data to be corrected. For example, a user may not want text data that is substantially accurate to be corrected. In these situations, the system 10 can allow a user to designate an accuracy threshold, and the system 10 can apply the threshold to determine whether text data should be corrected. For example, if generated text data has a percentage or other measurement of accurate words (as determined by the transcription server 20) that is equal to or greater than the accuracy threshold specified by the user, the system 10 can allow the text data to skip the correction process (and the associated training or learning process). The system 10 can deliver any generated text data that skips the correction process directly to its destination (e.g., directly sent to a user via an e-mail message, directly stored to a database, etc.). In some embodiments, the accuracy threshold can be set by a user using an interface of the system 10 (e.g., a website). The threshold can be applied to all text data or only to particular text data (e.g., only text data generated based on audio data received from a particular audio source, only text data that is associated with a particular destination, etc.).

Figure 4:
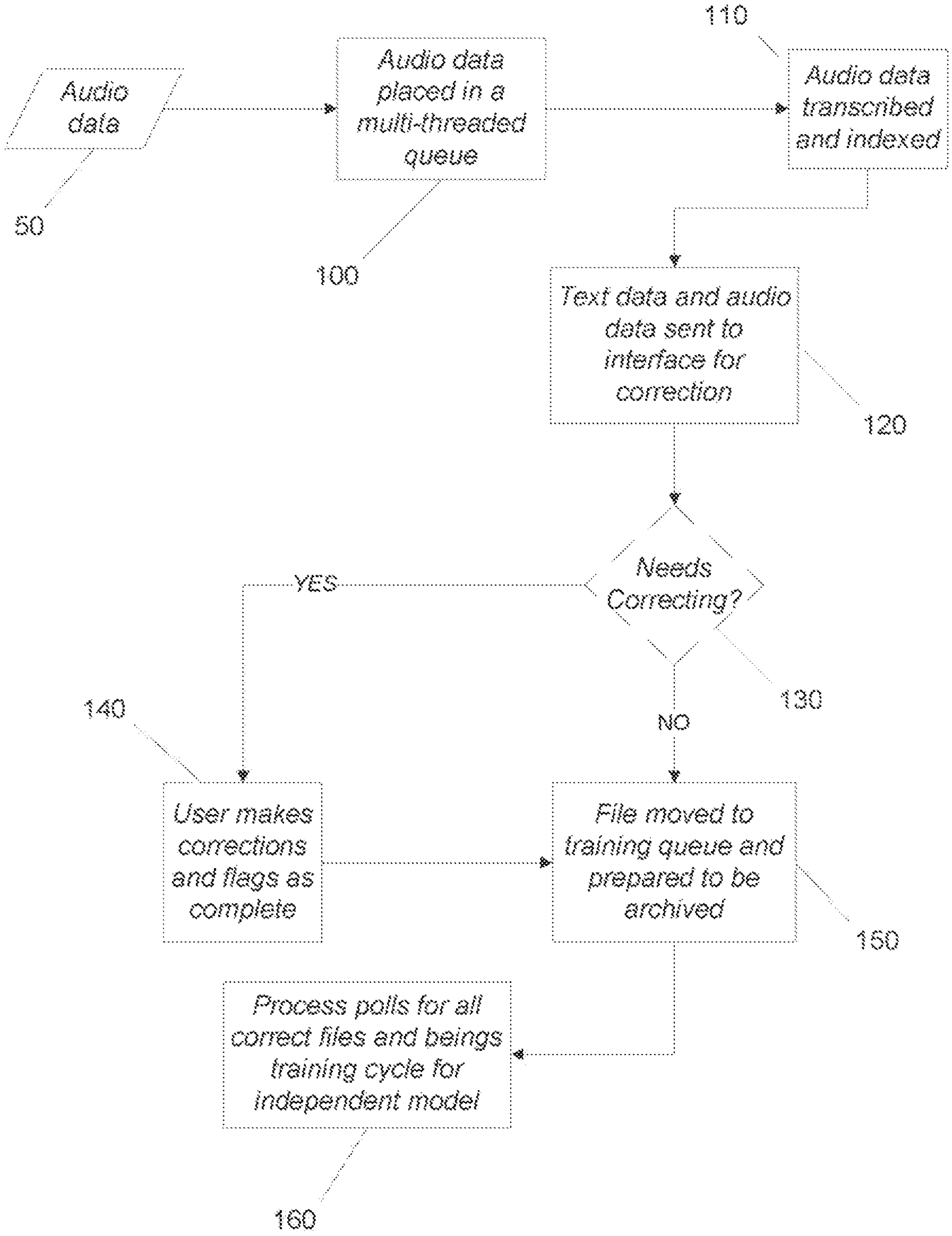
FIG. 4 illustrates a file transcription, correction, and training method according to an embodiment of the invention.

FIG. 4 illustrates an exemplary transcription, correction, and training method or process performed by the system 10. The transcription, correction, and training process of the system 10 can be a continual process by which files enter the system 10 and are moved through the series of steps shown in FIG. 4. As shown in FIG. 4 (also with reference to FIGS. 1-3), the transcription server 20 receives audio data 50 from one or more audio data sources 30 and/or one or more intermediary servers. Next, the transcription server 20 places the audio data 50 into one or more queues 60 (step 100). Once a translation server or processor 70 is available, the audio data 50 is transmitted from a queue 60 to a translation server 70. The translation server 70 transcribes the audio data to generate text data, and indexes the audio data (step 110).

After the audio data is indexed and transcribed, the audio data and/or generated text data is made available to a user for review and/or correction via a correction interface (step 120). If the text data needs to be corrected (step 130), the user makes the corrections and submits the corrections to the training server 90 of the transcription server 20 (step 140). The corrections are placed in a training queue and are prepared for archiving (step 150). Periodically, the training server 90 obtains all the corrected files from the training queue and begins a training cycle for an independent voice model (step 160). In other embodiments, the training server 90 obtains such corrected files immediately, rather than periodically. The training server 90 can be a server that is separate from the transcription server 20, and can update the transcription server 20 and/or any number of other servers on a continuous or periodic basis. In other embodiments, the training server 90, transcription server 20, and any other servers associated with the system 10 can be defined by the same computer. It should be understood that, as used herein and in the appended claims, the terms "server," "queue," "module, etc. are intended to encompass hardware and/or software adapted to perform a particular function.

Any portion or all of the transcription, correction, and training process performed by the system 10 can be performed by one or more polling managers (e.g., associated with the transcription server 20, the training server 90, or other servers). In some embodiments, the transcription server 20 and/or the training server 90 utilizes one or more "flags" to indicate a stage of a file. By way of example, only, these flags can include, without limitation or requirement: (1) waiting for transcription; (2) transcription in progress; (3) waiting for correction; (4) correction completed; (5) waiting for training; (6) training in progress; (7) retention; (8) move to history pending; and (9) history.

In some embodiments, the only action required by a user as a message moves through different stages of the system 10 is to indicate that correction of the message has been completed. In other embodiments, a less automated system can exist, requiring more input from a user during the transcription, correction, and training process.

Figure 5:
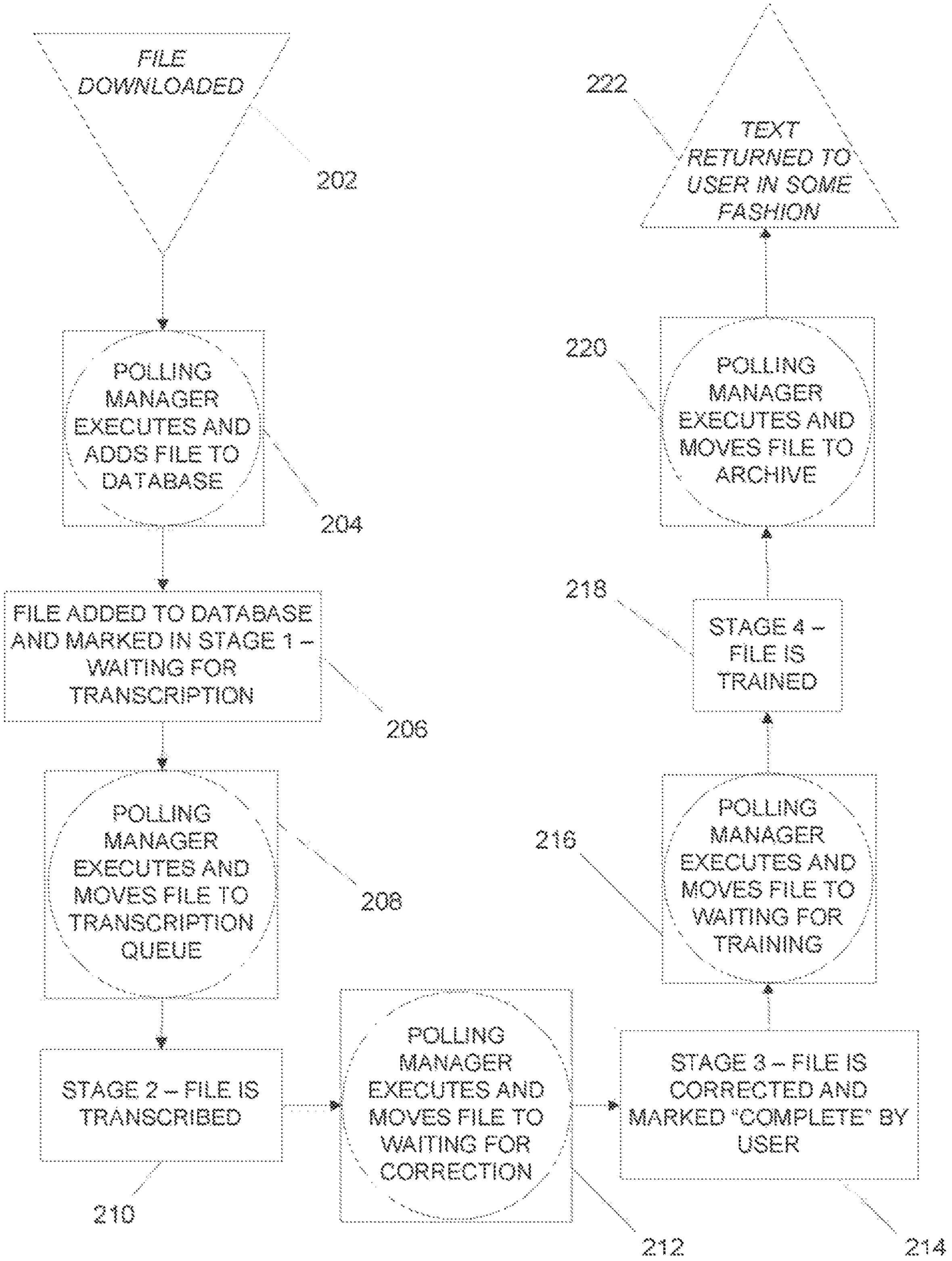
FIG. 5 illustrates another file transcription, correction, and training method according to an embodiment of the invention.

Another example of a method by which messages are processed in the system 10 is illustrated in FIG. 5. In this embodiment a polling manager is used to control the timing of file processing in the system. In particular, at least a portion of the transcription, correction, and training process is moved along by alternating actions of a polling manager. In some embodiments, the polling manager runs on a relatively short time interval to move files from stage to stage within the transcription, correction, and training process. Although not required, the polling manager can move multiple files in different stages to the next stage at the same time.

With reference to the exemplary embodiment illustrated in FIG. 5, the polling manager locates files to enter the transcription, correction, and training process. For example, the polling manager can check a list of FTP servers/locations for new files. New files identified by the polling manger are downloaded (step 202) and added to the database (step 204). When a file arrives, the polling manager flags the file "waiting for transcription" (step 206). The polling manager then executes and moves the file to a transcription queue (step 208), after which time the next available server/processor transcribes the file (step 210) on a first-in, first-out basis, unless a different priority is assigned. Once the file is assigned to a server/processor for transcription, the polling manager flags the file "transcription in progress." When transcription of the file is complete, the polling manager flags the file "waiting for correction" (step 212), and the file is made available to a user for correction (e.g., through a correction interface). When a user is done correcting the file, the polling manager flags the file "correction completed" (step 214) and returns or delivers the file based upon how the user wants files returned (e.g., FTP, e-mail, and the like). The polling manager then flags the file "waiting for training," and moves the corrected file into a waiting to be trained queue (step 216). During the time in which the training process runs (step 218), the polling manager flags the file "training in progress." After the training process, the polling manager flags the file "retention." In some embodiments, a user-defined retention determines when and whether files are archived. During the time in which a file is being archived (step 220), the polling manager flags the file "move to history pending." When a file has been archived, the polling manager flags the file "history."

The archival process allows files to move out of the system 10 immediately or based at least in part upon set retention rules. Archived or historical files allow the system 10 to keep current files available quickly while older files can be encrypted, compressed, and stored. Archived files can also be returned to a user (step 222) in any manner as described above.

In some embodiments, an interface of the system 10 (e.g., the correction interface) shows the stage of one or more files in the transcription, correction, and training process. This process can be automated and database driven so that all files are used to build and train the voice independent model.

It should be noted that a database-driven system 10 allows redundancy within the system. Multiple servers can share the load of the process described above. Also, multiple servers across different geographic regions can provide backup in the event of a natural disaster or other problem at one or more sites.

Figure 6:
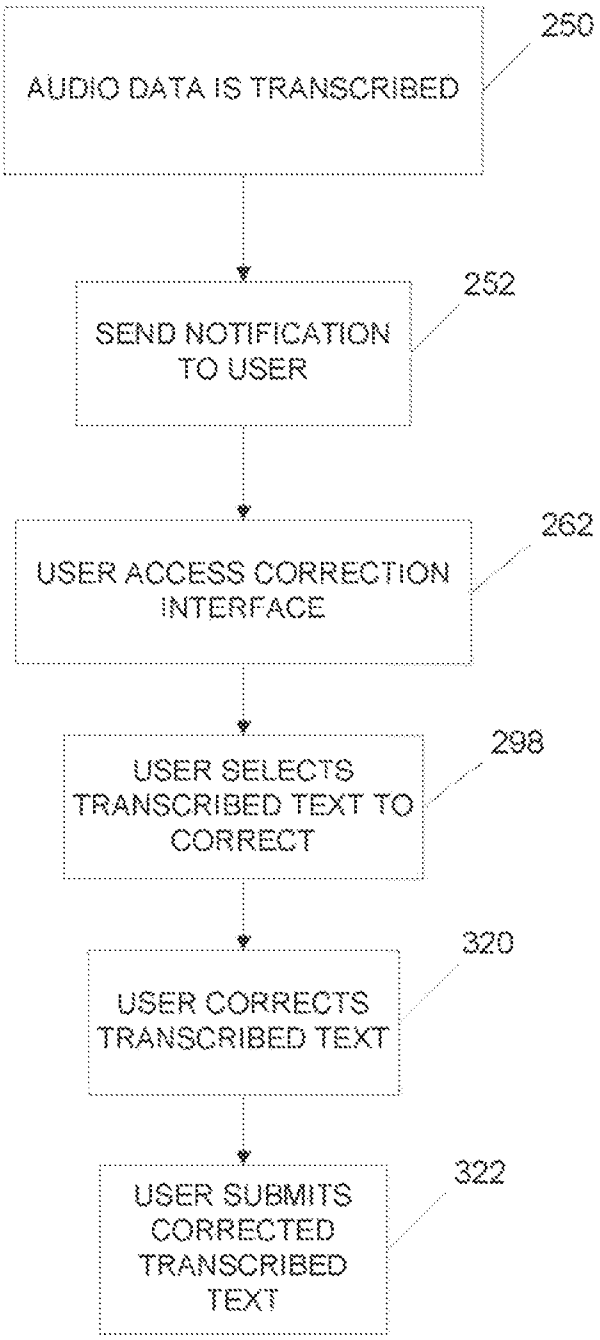
FIG. 6 illustrates a correction method according to an embodiment of the invention.

FIG. 6 illustrates a correction method according to an embodiment of the invention. The correction process of FIG. 6 beings when audio data is received by the transcription server 20 and transcribed (step 250). As described above with respect to FIGS. 1-3, the transcription server 20 can receive audio data from one or more audio data sources 30 and/or intermediary servers, such as a telephone, a VoIP voicemail server, a client computer, etc.

After the audio data is transcribed, the transcription server 20 sends a correction notification to a user (step 252). In some embodiments, the correction notification includes an e-mail notification, as shown in FIGS. 7-8. In other embodiments, the correction notification includes a text message, a telephone call, an audible signal and/or a visual signal (e.g., via a telephone), etc.

The transcription server 20 can send the correction notification to a user who is assigned to the correction of transcribed audio data associated with a particular owner or destination. For example, as the transcription server 20 transcribes voicemail messages for a particular member of an organization, the transcription server 20 can send a notification to a secretary or assistant of the member. An administrator can use an interface of the system 10 (e.g., a website) to configure one or more recipients who are to receive the correction notifications for a particular destination (e.g., a particular voicemail box). An administrator can also specify settings for notifications, such as the type of notification to send (e.g., e-mail, text, etc.), the addresses or identifiers of the notification recipients (e.g., e-mail addresses, telephone numbers, machine access control ("MAC") addresses, etc.), the information to be included in the notifications, etc. For example, an administrator can establish rules for sending correction notifications, such as transcriptions associated with audio data received by the transcription server 20 from a particular audio data source should be corrected by particular users. In addition, as described above, an administration can set one or more accuracy thresholds, which can dictate when transcribed audio data skips the correction process.

FIG. 7 illustrates an e-mail correction notification 254 according to an embodiment of the invention that is listed in an inbox 255 of an e-mail application. As shown in FIG. 7, the e-mail correction notification 254 is listed as an e-mail message in the inbox 255 similar to other e-mail messages 256 received from other sources. For example, the inbox 255 can display the sender of the e-mail correction notification 254 (i.e., the transcription server 20), an account or destination associated with the audio data and generated text data (e.g., an account number associated with a particular voicemail box), and an identifier of the source of the audio data (e.g., the name of an individual leaving a message in the voicemail box). As shown in FIG. 7, the identifier of the source of the audio data can optionally include an address or location of the audio data source, such as a phone number associated with the individual leaving a message in the voicemail box. In some embodiments (e.g., depending on the e-mail application used), the inbox 255 lists additional information about the notification 254, such as the size of the e-mail correction notification 254, the time the notification 254 was sent, and/or the date that the notification 254 was sent.

To read the e-mail correction notification 254, a user can select the notification 254 (e.g., by clicking on, highlighting, etc.) in the inbox 255. After the user selects the notification 254, the e-mail application can display the contents of the notification 254, as shown in FIG. 8. The contents of the e-mail correction notification 254 can include similar information as displayed in the inbox 255. The contents of the e-mail correction notification 254 can also indicate the length of the audio data transcribed by the transcription server 20 and the day, date, and/or time that the audio data was received by the transcription server 20. In addition, the contents of the e-mail correction notification 254 can include instructions on how to obtain and correct the generated text data. For example, the notification 254 can include a website address that the user can direct a browser application to (e.g., via a client computer) in order to access a correction interface for obtaining and correcting the generated text data. As shown in FIG. 8, the correction notification 254 can also include a link 257 that a user can select in order to directly access the correction interface (e.g., without manually directing a browser application and/or manually opening and executing a new application).

Figure 10:
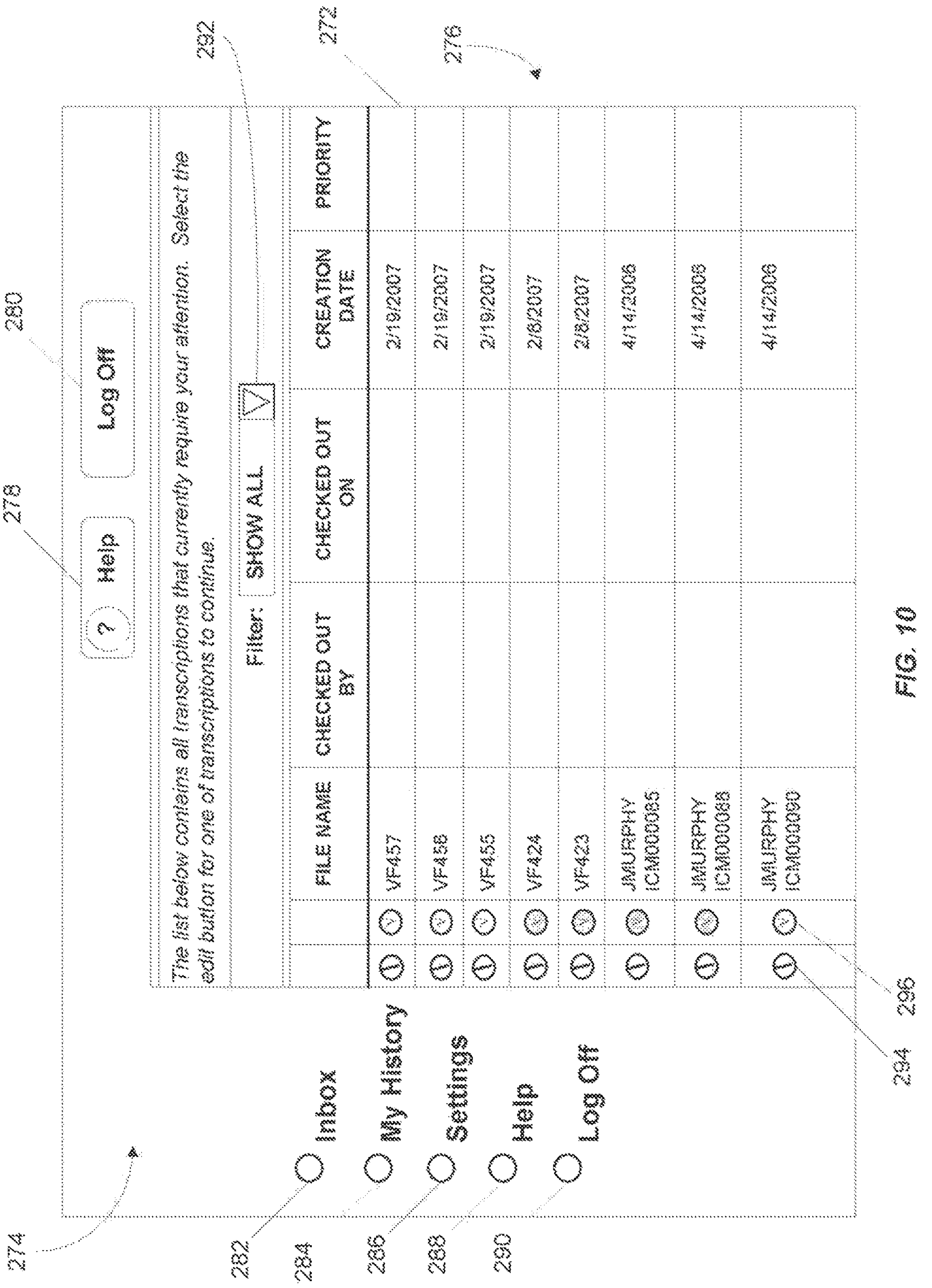
Figure 11:
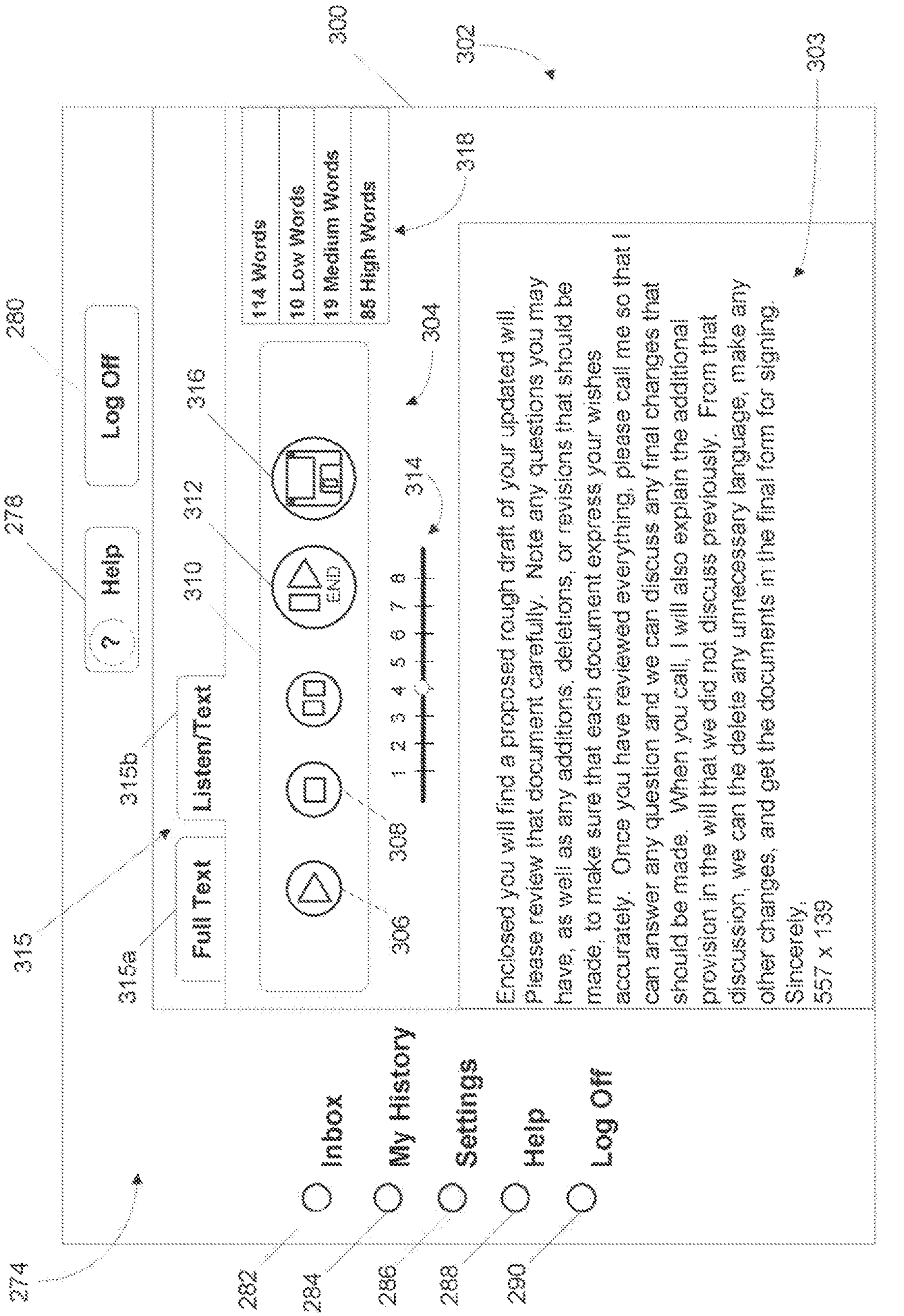
Figure 12:
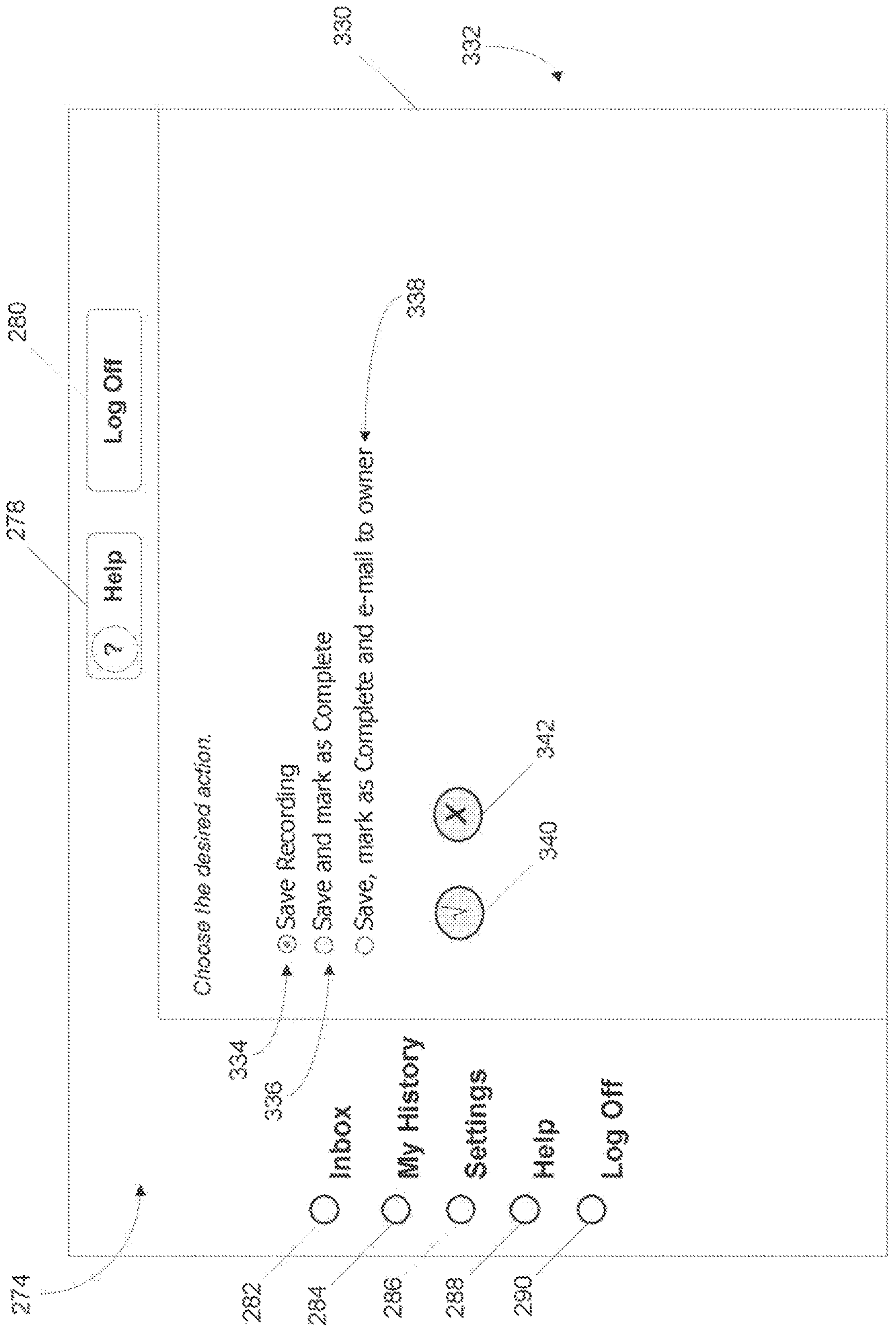

Returning to FIG. 6, after a user receives a correction notification 254, the user can access a correction interface 260 to review and correct the generated text data (if needed) (step 262). As described above with respect to FIG. 8, the user can select a link 257 included in the correction notification 254 order to access the correction interface 260. FIGS. 10-12 illustrate a correction interface 260 according to an embodiment of the invention.

Figure 9:
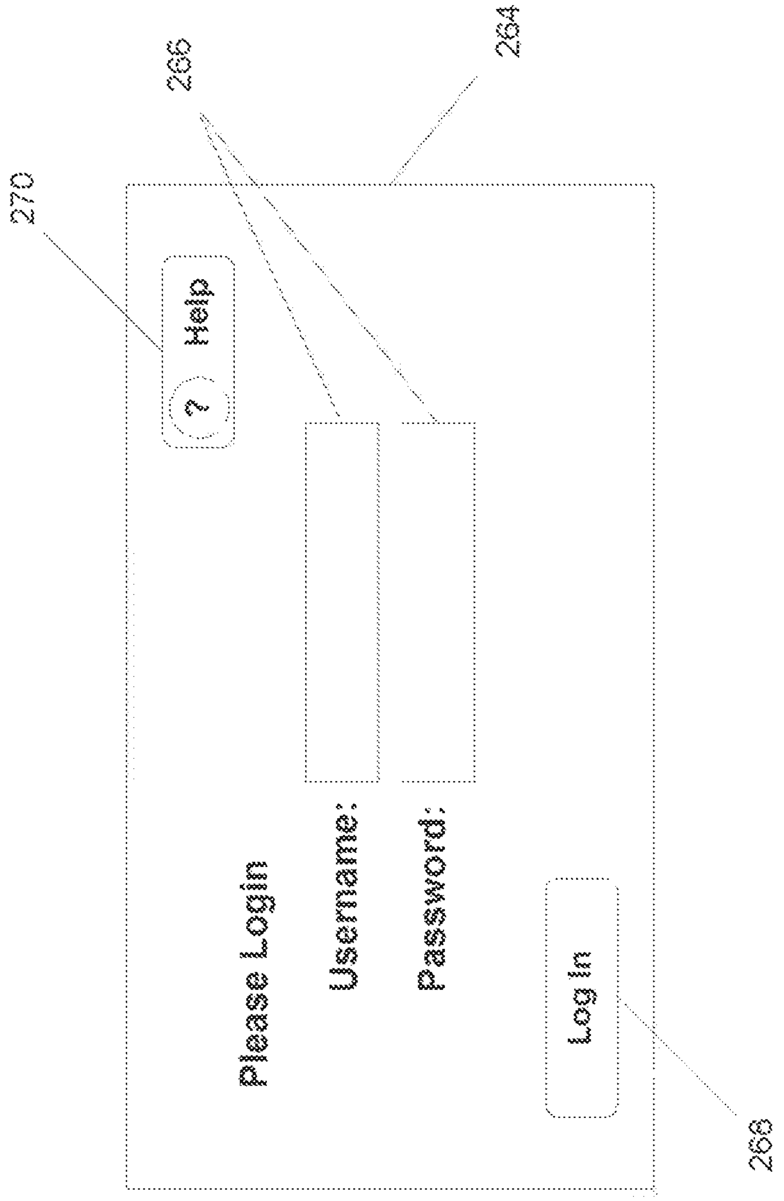
FIGS. 9-12 illustrate a correction interface according to an embodiment of the invention.

As shown in FIG. 9, to access the correction interface 260, the user may first be prompted to enter credentials and/or identifying information via a login screen 264 of the interface 260. For example, the login screen can include one or more selection mechanisms and/or input mechanisms 266 that enable a user to select or enter credentials and/or identifying information. As shown in FIG. 9, the login screen 264 can include input mechanisms 266 for entering a username and a password. The input mechanisms 266 can be case sensitive and/or can be limited to a predetermined set and/or number of characters. For example, the input mechanisms 266 can be limited to approximately 30 non-space characters. A user can enter his or her username and password (e.g., as set by the user or an administrator) and can select a log in selection mechanism 268. Alternatively, a user can select a help selection mechanism 270 in order to access instructions, tips, help web pages, electronic manuals, etc. for the correction interface 260.

After the user his or her credentials and/or identifying information, the correction interface 260 can verify the entered information, and, if verified, the correction interface 262 can display a main page 272, as shown in FIG. 10. The main page 272 can include a navigation area 274 and a view area 276. The navigation area 274 can include one or more selection mechanisms for accessing standard functions of the correction interface 260. For example, as shown in FIG. 10, the navigation area 274 can include a help selection mechanism 278 and a log off selection mechanism 280. As described above, a user can select the help selection mechanism 278 in order to access instructions, tips, help web pages, electronic manuals, etc. for the correction interface 260. A user can select the log off selection mechanism 280 in order to exit the correction interface 260. In some embodiments, if a user selects the log off selection mechanism 280, the correction interface 260 returns the user to the login page 264.

As shown in FIG. 10, the navigation area 274 can also include an inbox selection mechanism 282, a my history selection mechanism 284, a settings selection mechanism 286, a help selection mechanism 288, and/or a log off selection mechanism 290. A user can select the inbox selection mechanism 282 in order to view the main page 272. The user can select the my history selection mechanism 284 in order to access previously corrected transcriptions. In some embodiments, if a user selects the my history selection mechanism 284, the correction interface 260 displays a history page (not shown) similar to the main page 272 that lists previously corrected transcriptions. Alternatively or in addition to displaying the information displayed in the main page 272 (e.g., file name, checked out by, checked in by, creation date, priority), the history page can display correction date(s) for each transcription.

A user can select the settings selection mechanism 286 in order to access one or more setting pages (not shown) of the correction interface 260. The setting pages can enable a user to change his or her notification preferences, correction interface preferences (e.g., change a username and/or password, set a time limit for transcriptions displayed in a history page), etc. For example, as described above, a user can use the settings pages to specify destination settings for audio data and/or generated text data, configure commands and keyboard shortcuts, specify accuracy thresholds, configure the transcription server 20 to record voicemails from an external voicemail server, turn on or off particular features of the correction interface 260 and/or the system 10, etc. In some embodiments, the number and degree of settings configurable by a particular user via the settings pages are based on the permissions of the user. An administrator can use the setting pages to specify global settings, group settings (e.g., associated with particular permissions), and individual settings. In addition, an administrator can use a setting page of the correction interface 260 to specify users of the correction interface 260 and can establish usernames and passwords for users. Furthermore, as described above with respect to FIGS. 7 and 8, an administrator can use a setting page of the correction interface 260 to specify notification parameters, such as who receives particular notifications, what type of notifications are sent, what information is included in the notifications, etc.

As shown in FIG. 10, the view area 276 lists transcriptions (e.g., associated with the logged-in user) that need attention (e.g., correction). In some embodiments, the view area 276 includes one or more filter selection mechanisms 292, that a user can use to filter and/or sort the listed transcriptions. For example, a user can use a filter selection mechanism 292 to filter and/or sort transcriptions by creation date, priority, etc.

The view area 274 can also list additional information for each transcription. For example, as shown in FIG. 10, the view area 274 can list a file name, a checked out by parameter, a checked out on parameter, a creation date, and a priority for each listed transcription. The view area 274 can also include an edit selection mechanism 294 and a complete selection mechanism 296 for each transcription.

Returning to FIG. 6, after a user accesses the correction interface, the user can select a transcription to correct (step 298). As shown in FIG. 10, to correct a particular transcription, the user selects the edit selection mechanism 294 associated with the transcription. When a user selects an edit selection mechanism 294, the correction interface 260 displays a correction page 300, an example of which is shown in FIG. 11. The correction page 300 can include the navigation area 274, as described above with respect to FIG. 10, and a correction view area 302. The correction view area 302 can display the text data 303 generated by the transcription. A user can edit the text data 303 by deleting text, inserting text, cutting text, copying text, etc. within the correction view area.

In some embodiments, the correction view area 302 also includes a recording control area 304. The recording control area 304 can include one or more selection mechanisms for listening to or playing the audio data associated with the text data 303 displayed in the correction view area 302. For example, as shown in FIG. 11, the recording control area 304 can include a play selection mechanism 306, a stop selection mechanism 308, and a pause selection mechanism 310. A user can select the play selection mechanism 306 to play the audio data from the beginning and can select the stop selection mechanism 308 to stop the audio data. Similarly, a user can select the pause selection mechanism 310 to pause the audio data. In some embodiments, selecting the pause selection mechanism 310 after pausing the audio data causes the correction interface 260 to continue playing the audio data (e.g., from the point at which the audio data was paused).

As shown in FIG. 11, the recording control area 304 can also include a continue from cursor selection mechanism 312. A user can select the continue from cursor selection mechanism 312 in order to starting playing the audio data at a location corresponding to the position of the cursor within the text data 303. For example, if a user places a cursor within the text data 303 before the word "Once" and selects the continue from cursor selection mechanism 312, the correction interface 260 plays the audio data starting from the word "Once." In some embodiments, the recording control area 304 also includes a playback control selection mechanism 314 that a user can use to specify a number of seconds to play before playing the audio data starting at the cursor position. For example, as shown in FIG. 11, a user can specify 1 to 8 seconds using the play control selection mechanism 314 (e.g., by dragging an indicator along the timeline or in another suitable manner). After setting the playback control selection mechanism 314, the user can select the continue from cursor selection mechanism 312, which causes the correction interface 260 to play the audio data starting at the cursor position minus the number of seconds specified by the play control selection mechanism 314.

In some embodiments, the recording control area 304 can also include a speed control mechanism (not shown) that allows a user to decrease and increase the playback speed of audio data. For example, the recording control area 304 can include a speed control mechanism that includes one or more selection mechanisms (e.g., buttons, timelines, etc.). A user can select (e.g., click, drag, etc.) the selection mechanisms in order to increase or decrease the playback of audio data by a particular speed. In some embodiments, the speed control mechanism can also include a selection mechanism that a user can select in order to play audio data at normal speed.

In some embodiments, a user can hide the recording control area 304. For example, as shown in FIG. 11, the correction view area 302 can include one or more selection mechanisms 315 (e.g., tabs) that enable a user to choose whether to view the text data 303 only (e.g., by selecting a full text tab 315*a*) or to view the text data 303 and the recording control area 304 (e.g., by selecting a listen/text tab 315*b*).

The correction view area 302 can also include a save selection mechanism 316. A user can select the save selection mechanism 316 in order to save the current state of the corrected text data 303. A user can select the save selection mechanism 316 at any time during the correction process.

The correction view area 302 can also include a table 318 that lists, among other things, the system's confidence in its transcription quality. For example, as shown in FIG. 11, the correction view area 302 can list the total number of words in the text data 303, the number of low-confidence words in the text data 303, the number of medium-confidence words in the text data 303, and/or the number of high-confidence words in the text data. "Low" words can include words that are least likely to be correct. "Medium" words can include words that are moderately likely to be correct. "High" words can include words that are very likely to be correct. In some embodiments, if the number of low words in the text data 303 is close to the number of total words in the text data 303, it may be useful for the user to delete the text data 303 and manually retype the text data 303 by listening to the corresponding audio data. This situation may occur if the audio data was received from an audio data source (e.g., a caller) that the system 10 has not previously received data from or has not previously received significant data from.

Returning to FIG. 6, after a user selects a transcription to correct, the user corrects the transcription as necessary via the correction interface 260 (step 320) and submits or saves the corrected transcription (step 322). As described above with respect to FIG. 11, to submit or save corrected text data 303, a user can select the save selection mechanism 316 included in the correction page 300. In some embodiments, when a user selects the save selection mechanism 316, the correction interface 260 displays a save options page 330, as shown in FIG. 12. The save options page 330 can include the navigation area 274, as described above with respect to FIGS. 10 and 11, and a save options view area 332. The save options view area 332 can display one or more selection mechanisms for saving the current state of the corrected text data 303. For example, as shown in FIG. 12, the options view area 332 can include a save recording selection mechanism 334, a save and mark as complete selection mechanism 336, and a save, mark as complete and send to owner selection mechanism 338. A user can select the save recording selection mechanism 334 in order to save the current state of the text data 303 with any corrections made by the user and returns the user to the main page 272. A user may select the save recording selection mechanism 334 if the user has not finished making corrections to the text data 303 but wants to stop working on the corrections at the current time. A user may also select the save recording selection mechanism 334 if the user wants to periodically save corrections when working on long transcriptions. In some embodiments, the save recording selection mechanism 334 is the default selection.

A user can select the save and mark as complete selection mechanism 336 in order to save the corrections made by the user and move the transcription to the user's history. Once the corrections are saved and moved to the history folder, the user can access the corrected transcription (e.g., via the history page of the correction interface 260) but may not be able to edit the corrected transcription.

A user can select the save, mark as complete and send to or selection mechanism 338 in order to save the corrected transcription, move the corrected transcription to the user's history folder, and send the corrected transaction and/or the associated audio data to the owner or destination of the audio data (e.g., the owner of the voicemail box). As described above, a destination for corrected transcriptions can include files, e-mail inboxes, remote printers, databases, etc. For example, the correction interface 260 can send a message notification to the owner of the transcription that includes the corrected transcription (e.g., as text within the message or as an attached file). FIG. 13 illustrates an e-mail message notification 339 according to an embodiment of the invention. As shown in FIG. 13, the notification 339 includes the corrected transcription.

Once a user selects a save option, the user can select an accept selection mechanism 340 in order to accept the selected option or can select a cancel selection mechanism 342 in order to cancel the selected option. In some embodiments, if a user selects the cancel selection mechanism 342, the correction interface 260 returns the user to the correction page 300.

A user can also select a complete selection mechanism 296 included in the main page 272 of the correction interface 260 in order to submit or save transcriptions. In some embodiments, if a user selects a complete selection mechanism 296 included in the main page 272, the correction interface 260 displays the save options page 330 as described above with respect to FIG. 12. In other embodiments, if a user selects a complete selection mechanism 296 included in the main page 272, the correction interface 260 automatically saves any previous corrections made to the transcription associated with the complete selection mechanism 296, moves the corrected transcription to the user's history folds, and sends the completed transcription and/or the corresponding audio data to the owner or destination associated with the transcription.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention. For example, in some embodiments the transcription server 20 utilizes multiple threads to transcribe multiple files concurrently. This process can use a single database or a cluster of databases holding temporary information to assist in multiple thread transcription on the same or different machines. Each system or device included in embodiments of the present invention can also be performed by one or more machines and/or one or more virtual machines.

Various features and advantages of the invention are set forth in the following claims.

The invention claimed is:

1. A memory device having instructions stored thereon that, in response to execution by a processor, cause the processor to perform operations comprising:

generating a transcription of a first portion of audio data using a voice model, wherein the audio data comprises a single audio file with a recording of a plurality of speakers;

storing the transcription;

making the transcription available to a plurality of users over at least one computer network through a browser-based user interface, wherein the transcription is shared with the plurality of users;

receiving a correction to the transcription of the first portion of the audio data over the at least one computer network from at least one of the plurality of users through the browser-based user interface;

converting the correction to the transcription of the first portion of the audio data into an updated voice model; and generating a transcription of a second portion of audio data using the updated voice model.

2. The memory device of claim 1, wherein the voice model comprises a voice-independent model.

3. The memory device of claim 1, wherein at least one of the first portion of the audio data and the second portion of the audio data originates from a VoiP voicemail server.

4. The memory device of claim 1, wherein at least one of the first portion of the audio data and the second portion of the audio data originates from a client computer coupled to at least one computer network.

5. The memory device of claim 1, wherein the operations further comprise extracting at least one of the first portion of the audio data and the second portion of the audio data from an e-mail message.

6. The memory device of claim 1, wherein the operations further comprise requesting at least one of the first portion of the audio data and the second portion of the audio data from a remote source.

7. The memory device of claim 1, wherein the operations further comprise prioritizing the first portion of the audio data.

8. The memory device of claim 1, wherein the first portion of the audio data comprises a first remotely user-selected portion of the audio data, and wherein the second portion of the audio data includes a second remotely user-selected portion of the audio data.

9. The memory device of claim 1, wherein the operations further comprise determining when each of the plurality of speakers is speaking.

10. The memory device of claim 1, wherein the transcription of the first portion of audio data comprises a first text data set associated with one of the plurality of speakers and a second text data set associated with another one of the plurality of speakers.

11. A method comprising:

generating a transcription of a first portion of audio data using a voice model, wherein the audio data comprises a single audio file with a recording of a plurality of speakers;

storing the transcription;

making the transcription available to a plurality of users over at least one computer network through a browser-based user interface, wherein the transcription is shared with the plurality of users;

receiving a correction to the transcription of the first portion of the audio data over the at least one computer network from at least one of the plurality of users through the browser-based user interface;

converting the correction to the transcription of the first portion of the audio data into an updated voice model; and generating a transcription of a second portion of audio data using the updated voice model.

12. The method of claim 11, wherein the voice model comprises a voice-independent model.

13. The method of claim 11, wherein at least one of the first portion of the audio data and the second portion of the audio data originates from a VoiP voicemail server.

14. The method of claim 11, wherein at least one of the first portion of the audio data and the second portion of the audio data originates from a client computer coupled to at least one computer network.

15. The method of claim 11, further comprising extracting at least one of the first portion of the audio data and the second portion of the audio data from an e-mail message.

16. The method of claim 11, further comprising requesting at least one of the first portion of the audio data and the second portion of the audio data from a remote source.

17. The method of claim 11, wherein the first portion of the audio data comprises a first remotely user-selected portion of the audio data, and wherein the second portion of the audio data includes a second remotely user-selected portion of the audio data.

18. The method of claim 11, further comprising determining when each of the plurality of speakers is speaking.

19. The method of claim 11, wherein the transcription of the first portion of audio data comprises a first text data set associated with one of the plurality of speakers and a second text data set associated with another one of the plurality of speakers.

20. A system comprising:

means for generating a transcription of a first portion of audio data using a voice model, wherein the audio data comprises a single audio file with a recording of a plurality of speakers;

means for storing the transcription;

means for making the transcription available to a plurality of users over at least one computer network through a browser-based user interface, wherein the transcription is shared with the plurality of users;

means for receiving a correction to the transcription of the first portion of the audio data over the at least one computer network from at least one of the plurality of users through the browser-based user interface;

means for converting the correction to the transcription of the first portion of the audio data into an updated voice model; and means for generating a transcription of a second portion of audio data using the updated voice model.

* * * * *